(12) United States Patent
Horsch

(10) Patent No.: US 6,190,280 B1
(45) Date of Patent: Feb. 20, 2001

(54) MULTISPEED POWERSHIFT TRANSMISSION

(76) Inventor: Joachim Horsch, 1128 S. Ahrens, Lombard, IL (US) 60148

( * ) Notice: Under 35 U.S.C. 154(b), the term of this patent shall be extended for 0 days.

(21) Appl. No.: 09/381,554

(22) PCT Filed: Jan. 16, 1999

(86) PCT No.: PCT/US99/00906
§ 371 Date: Sep. 16, 1999
§ 102(e) Date: Sep. 16, 1999

(87) PCT Pub. No.: WO99/36285
PCT Pub. Date: Jul. 22, 1999

Related U.S. Application Data

(60) Provisional application No. 60/071,656, filed on Jan. 16, 1998, and provisional application No. 60/075,180, filed on Feb. 19, 1998.

(51) Int. Cl.[7] .................................................. F16H 37/00
(52) U.S. Cl. ............................................. 475/209; 475/218
(58) Field of Search ................................... 475/209, 218

(56) References Cited

U.S. PATENT DOCUMENTS 4,614,133 * 9/1986 Nerstad et al. ..................... 475/218

* cited by examiner

*Primary Examiner*—Dirk Wright
(74) *Attorney, Agent, or Firm*—John W. Harbst

(57) ABSTRACT

A mechanical power transmission system for an engine or motor driven vehicle is disclosed. The transmission of the present invention includes an input transmission, a compound planetary transmission, and an output transmission. The compound planetary transmission includes two input and two outputs. The input transmission has a single input connected to the engine or motor of the vehicle and two outputs connected to the two inputs to the planetary transmission. The output transmission includes two inputs connected to the two outputs of the planetary transmission and one output connected through suitable gearing to the wheels of the vehicle or any other mechanism to be driven by a motoring device at various speed ratios.

49 Claims, 22 Drawing Sheets

27 SPD. FWD., 9 SPD. REV. 6SPD. CREEP TRANSMISSION

| GEAR SELEC-TION | CLUTCH ACTIVE | SPEED SUN GEAR S1 RPM | SPEED RING GEAR R RPM | SPEED CAR-RIER C RPM | SPEED SUN GEAR S2 RPM | SPEED OUT-PUT RPM | SPEED VEH-ICLE KPH | SPEED CHG. % | NO. OF CLUTCH SWAPS GEAR TO GEAR | NO. OF CLUTCH SWAPS SKIP UP-SHIFT |
|---|---|---|---|---|---|---|---|---|---|---|
| 1 | f,1,6, | 868 | 236 | 348 | 60 | 87 | 1.05 | 21 | 1 | 3 |
| 2 | f,1,4 | 868 | 327 | 423 | 176 | 106 | 1.27 | 55 | 3 | 1 |
| 3 | r,2,5 | -868 | 326 | 113 | 658 | 165 | 1.98 | 32 | 2 | 2 |
| 4 | f,1,2, | 868 | 868 | 868 | 868 | 217 | 2.61 | 35 | 2 | 2 |
| 5 | F,1,r, | -868 | 1619 | 1175 | 2310 | 294 | 3.54 | 13 | 1 | 1 |
| 6 | F,1,b, | 0 | 1619 | 1330 | 2069 | 332 | 4.00 | 12 | 1 | 1 |
| 7 | F,1,f, | 868 | 1619 | 1485 | 1828 | 371 | 4.47 | 9 | 1 | 1 |
| 8 | F,1,2, | 1619 | 1619 | 1619 | 1619 | 405 | 4.87 | 13 | 1 | 1 |
| 9 | F,2,f, | 868 | 1619 | 1485 | 1828 | 457 | 5.50 | 13 | 1 | 1 |
| 10 | F,2,b, | 0 | 1619 | 1330 | 2069 | 517 | 6.23 | 12 | 1 | 1 |
| 11 | F,2,r, | -868 | 1619 | 1175 | 2310 | 577 | 6.95 | 9 | 1 | 1 |
| 12 | F,2,3, | -1590 | 1619 | 1046 | 2510 | 628 | 7.56 | 12 | 1 | 1 |
| 13 | F,3,r, | -868 | 1619 | 1175 | 2310 | 705 | 8.49 | 13 | 1 | 1 |
| 14 | F,3,b, | 0 | 1619 | 1330 | 2069 | 798 | 9.61 | 12 | 1 | 1 |
| 15 | F,3,f, | 868 | 1619 | 1485 | 1828 | 891 | 10.73 | 9 | 1 | 1 |
| 16 | F,3,4, | 1619 | 1619 | 1619 | 1619 | 971 | 11.70 | 13 | 1 | 1 |
| 17 | F,4,f, | 868 | 1619 | 1485 | 1828 | 1097 | 13.20 | 13 | 1 | 1 |
| 18 | F,4,b, | 0 | 1619 | 1330 | 2069 | 1241 | 14.95 | 12 | 1 | 1 |
| 19 | F,4,r, | -868 | 1619 | 1175 | 2310 | 1386 | 16.69 | 9 | 1 | 1 |
| 20 | F,4,5, | -1626 | 1619 | 1040 | 2520 | 1512 | 18.21 | 13 | 1 | 1 |
| 21 | F,5,r, | -868 | 1619 | 1175 | 2310 | 1709 | 20.58 | 13 | 1 | 1 |
| 22 | F,5,b, | 0 | 1619 | 1330 | 2069 | 1934 | 23.29 | 12 | 1 | 1 |
| 23 | F,5,f, | 868 | 1619 | 1485 | 1828 | 2160 | 26.01 | 9 | 1 | 1 |
| 24 | F,5,6, | 1619 | 1619 | 1619 | 1619 | 2355 | 28.36 | 13 | 1 | 1 |
| 25 | F,6,f, | 868 | 1619 | 1485 | 1828 | 2658 | 32.01 | 13 | 1 | 1 |
| 26 | F,6,b, | 0 | 1619 | 1330 | 2069 | 3009 | 36.23 | 12 | 1 | 1 |
| 27 | F,6,r, | -868 | 1619 | 1175 | 2310 | 3360 | 40.45 | | | |
| 1 CR | B,f,1, | 868 | 0 | 155 | -241 | 39 | 0.47 | 56 | 2 | 1 |
| 2 CR | B,r,2, | -868 | 0 | -155 | 241 | 60 | 0.73 | 54 | 2 | 1 |
| 3 CR | B,f,3, | 868 | 0 | 155 | -241 | 93 | 1.12 | 56 | 2 | 1 |
| 4 CR | B,r,4, | -868 | 0 | -155 | 241 | 145 | 1.74 | 56 | 2 | 1 |
| 5 CR | B,f,5, | 868 | 0 | 155 | -241 | 225 | 2.71 | 56 | 2 | |
| | B,r,6, | -868 | 0 | -155 | 241 | 351 | 4.22 | | | |
| 1R | r,1,6, | -868 | -236 | -348 | -60 | -87 | -1.05 | 21 | 1 | 3 |
| 2R | r,1,4, | -868 | -327 | -423 | -176 | -106 | -1.27 | 55 | 3 | 1 |
| 3R | f,2,5 | 868 | -326 | -113 | -658 | -165 | -1.98 | 32 | 2 | 3 |
| 4R | r,1,2, | -868 | -868 | -868 | -868 | -217 | -2.61 | 17 | 2 | 2 |
| 5R | r,3,6, | -868 | -325 | -422 | -174 | -253 | -3.05 | 35 | 2 | 1 |
| 6R | f,2,3, | 868 | -884 | -571 | -1370 | -343 | -4.13 | 52 | 2 | 2 |
| 7R | r,3,4, | -868 | -868 | -868 | -868 | -521 | -6.27 | 55 | 2 | 2 |
| 8R | f,4,5, | 868 | -864 | -555 | -1348 | -807 | -9.72 | 56 | 2 | |
| 9R | r,5,6, | -868 | -868 | -868 | -868 | -1262 | -15.20 | | | |

INPUT SPEED: 2000RPM
FINAL DRIVE RATIO: 28.5 TO 1

FIG. 2

22 SPEED FWD AND REV TRANSMISSION

SPEED CHART

| MODE PURE HYDRO OR HYDRO MECH. | CLUTCH ACTIVE | SPEED SUN GEAR S1 RPM | SPEED RING GEAR R RPM | SPEED CARRIER C RPM | SPEED SUN GEAR S2 RPM | SPEED OUTPUT RPM | SPEED VEHICLE KPH | RATIO Pull to Traction Small Hydro Unit | RATIO Pull to Traction Large Hydro Unit |
|---|---|---|---|---|---|---|---|---|---|
| H.M. | F,1, | -1800.00 | 1523.81 | 859.048 | 2631.75 | 243.61 | 2.93 | 2.31 | 2.31 |
| H.M. | F,1, | 0 | 1523.81 | 1219.05 | 2031.75 | 345.70 | 4.16 | 1.63 | 1.63 |
| H.M. | F,1, | 830.19 | 1523.81 | 1385.09 | 1755.02 | 392.79 | 4.73 | 1.43 | 1.43 |
| H.M. | F,1 or 2, | 1523.81 | 1523.81 | 1523.81 | 1523.81 | 432.13 | 5.20 | 1.30 | 1.30 |
| H.M. | F,2, | 830.19 | 1523.81 | 1385.09 | 1755.02 | 497.69 | 5.99 | 1.13 | 1.13 |
| H.M. | F,2, | 0 | 1523.81 | 1219.05 | 2031.75 | 576.17 | 6.94 | 0.98 | 0.98 |
| H.M. | F,2, | -830.19 | 1523.81 | 1053.01 | 2308.48 | 654.64 | 7.88 | 0.86 | 0.86 |
| H.M. | F,2 or 3, | -1505.17 | 1523.81 | 918.01 | 2533.47 | 718.45 | 8.65 | 0.78 | 0.78 |
| H.M. | F,3, | -830.19 | 1523.81 | 1053.01 | 2308.48 | 824.09 | 9.92 | 0.68 | 0.68 |
| H.M. | F,3, | 0 | 1523.81 | 1219.05 | 2031.75 | 954.04 | 11.49 | 0.59 | 0.59 |
| H.M. | F,3, | 830.19 | 1523.81 | 1385.09 | 1755.02 | 1083.98 | 13.05 | 0.52 | 0.52 |
| H.M. | F,3 or 4, | 1523.81 | 1523.81 | 1523.81 | 1523.81 | 1192.55 | 14.36 | 0.47 | 0.47 |
| H.M. | F,4, | 830.19 | 1523.81 | 1385.09 | 1755.02 | 1373.49 | 16.54 | 0.41 | 0.41 |
| H.M. | F,4, | 0 | 1523.81 | 1219.05 | 2031.75 | 1590.06 | 19.15 | 0.35 | 0.35 |
| H.M. | F,4, | -830.19 | 1523.81 | 1053.01 | 2308.48 | 1806.63 | 21.75 | 0.31 | 0.31 |
| H.M. | F,4 or 5, | -1497.28 | 1523.81 | 919.59 | 2530.84 | 1980.66 | 23.85 | 0.28 | 0.28 |
| H.M. | F,5, | -830.19 | 1523.81 | 1053.01 | 2308.48 | 2268.02 | 27.31 | 0.25 | 0.25 |
| H.M. | F,5, | 0 | 1523.81 | 1219.05 | 2031.75 | 2625.64 | 31.61 | 0.21 | 0.21 |
| H.M. | F,5, | 1800.00 | 1523.81 | 1579.05 | 1431.75 | 3401.03 | 40.95 | 0.17 | 0.17 |
| P.H. | 1,4, | 1800.00 | 700.03 | 920.025 | 333.38 | 260.90 | 3.14 | 1.03 | 2.16 |
| P.H. | 2,5, | -1800.00 | 703.02 | 202.413 | 1537.35 | 435.97 | 5.25 | 0.62 | 1.29 |
| P.H. | 1,2, | 1800.00 | 1800.00 | 1800 | 1800.00 | 510.45 | 6.15 | 0.53 | 1.10 |
| P.H. | 2,3, | -1800.00 | 1822.30 | 1097.84 | 3029.73 | 859.18 | 10.34 | 0.31 | 0.65 |
| P.H. | 3,4, | 1800.00 | 1800.00 | 1800 | 1800.00 | 1408.70 | 16.96 | 0.19 | 0.40 |
| P.H. | 4,5. | -1800.00 | 1831.89 | 1105.51 | 3042.52 | 2381.10 | 28.67 | 0.11 | 0.24 |
| P.H. | B,1, | 1800 | 0 | 360.00 | -600.00 | 102.09 | 1.23 | 2.64 | 5.51 |
| P.H. | B,2, | -1800 | 0 | -360.00 | 600.00 | 170.15 | 2.05 | 1.58 | 3.31 |
| P.H. | B,3, | 1800 | 0 | 360.00 | -600.00 | 281.74 | 3.39 | 0.96 | 2.00 |
| P.H. | B,4, | -1800 | 0 | -360.00 | 600.00 | 469.57 | 5.65 | 0.57 | 1.20 |
| P.H. | B,5, | 1800 | 0 | 360.00 | -600.00 | 775.38 | 9.34 | 0.35 | 0.73 |

FIG. 4

INPUT SPEED: 2000RPM
FINAL DRIVE RATIO: 28.5 TO 1
TRACTION LIMIT: 23300 LBS G.V.W. * .8 COEF. OF TRACTION
DRIVE LINE EFFICIENCY: 80%

FULL FWD AND REV CONTINUOSLY VARIABLE TRANSMISSION OPTION FOR 22 SPEED FWD AND REV TRANSMISSION

SPEED CHART

| MODE PURE HYDRO OR HYDRO MECH. | CLUTCH ACTIVE | SPEED SUN GEAR S1 RPM | SPEED RING GEAR R RPM | SPEED CARRIER C RPM | SPEED SUN GEAR S2 RPM | SPEED OUTPUT RPM | SPEED VEHICLE KPH | RATIO Pull to Traction Small Hydro Motor | RATIO Pull to Traction Large Hydro Motor |
|---|---|---|---|---|---|---|---|---|---|
| P.H. | 1,2, | 0 | 0 | 0 | 0 | 0 | 0 | 0 | 0 |
| P.H. | 1,2. | 1523.81 | 1523.81 | 1523.81 | 1523.81 | 432.13 | 5.20 | 0.53 | 1.30 |
| H.M. | F,1 or 2, | 1523.81 | 1523.81 | 1523.81 | 1523.81 | 432.13 | 5.20 | 1.30 | 1.30 |
| H.M. | F,2, | 0 | 1523.81 | 1219.05 | 2031.75 | 576.17 | 6.94 | 0.98 | 0.98 |
| H.M. | F,2 or 3, | -1505.17 | 1523.81 | 918.01 | 2533.47 | 718.45 | 8.65 | 0.78 | 0.78 |
| H.M. | F,3, | 0 | 1523.81 | 1219.05 | 2031.75 | 954.04 | 11.49 | 0.59 | 0.59 |
| H.M. | F,3 or 4, | 1523.81 | 1523.81 | 1523.81 | 1523.81 | 1192.55 | 14.36 | 0.47 | 0.47 |
| H.M. | F,4, | 0 | 1523.81 | 1219.05 | 2031.75 | 1590.06 | 19.15 | 0.35 | 0.35 |
| H.M. | F,4 or 5, | -1497.28 | 1523.81 | 919.59 | 2530.84 | 1980.68 | 23.85 | 0.28 | 0.28 |
| H.M. | F,5, | 0 | 1523.81 | 1219.05 | 2031.75 | 2625.64 | 31.61 | 0.21 | 0.21 |
| H.M. | F,5, | 1800.00 | 1523.81 | 1579.05 | 1431.75 | 3401.03 | 40.95 | 0.17 | 0.17 |
| P.H. | 1,4, | 1800.00 | 700.03 | 920.025 | 333.38 | 260.90 | 3.14 | 1.03 | 2.16 |
| P.H. | 2,5 | -1800.00 | 703.02 | 202.413 | 1537.35 | 435.97 | 5.25 | 0.62 | 1.29 |
| P.H. | 1,2, | 1800.00 | 1800.00 | 1800 | 1800.00 | 510.45 | 6.15 | 0.53 | 1.10 |
| P.H. | 2,3, | -1800.00 | 1822.30 | 1097.84 | 3029.73 | 859.18 | 10.34 | 0.31 | 0.65 |
| P.H. | 3,4, | 1800.00 | 1800.00 | 1800 | 1800.00 | 1408.70 | 16.96 | 0.19 | 0.40 |
| P.H. | 4,5. | -1800.00 | 1831.89 | 1105.51 | 3042.52 | 2381.10 | 28.67 | 0.11 | 0.24 |

INPUT SPEED: 2000RPM
FINAL DRIVE RATIO:28.5 TO 1
TRACTION LIMIT:23300 LBS G.V.W. * .8 COEF. OF TRACTION
DRIVE LINE EFFICIENCY: 80%

FIG. 7

22 SPD. FWD., 6 SPD. REV., 5 SPD. CREEP TRANSMISSION

| GEAR SELEC-TION | CLUTCH ACTIVE | SPEED SUN GEAR S1 RPM | SPEED RING GEAR R RPM | SPEED CAR-RIER C RPM | SPEED SUN GEAR S2 RPM | SPEED OUT-PUT RPM | SPEED VEH-ICLE KPH | SPEED CHG. % | NO. OF CLUTCH SWAPS GEAR TO GEAR | NO. OF CLUTCH SWAPS SKIP UP-SHIFT |
|---|---|---|---|---|---|---|---|---|---|---|
| 1 | f,1,4 | 880 | 343 | 451 | 164 | 138 | 1.41 | 66.99 | 3 | 1 |
| 2 | r,2,5 | -880 | 344 | 99 | 752 | 231 | 2.35 | 16.98 | 2 | 2 |
| 3 | f,1,2, | 880 | 880 | 880 | 880 | 270 | 2.75 | 28.84 | 2 | 2 |
| 4 | F,1,r, | -880 | 1637 | 1134 | 2476 | 347 | 3.55 | 15.52 | 1 | 1 |
| 5 | F,1,b, | 0 | 1637 | 1310 | 2183 | 401 | 4.10 | 13.44 | 1 | 1 |
| 6 | F,1,f, | 880 | 1637 | 1486 | 1890 | 455 | 4.65 | 10.19 | 1 | 1 |
| 7 | F,1,2, | 1637 | 1637 | 1637 | 1637 | 502 | 5.12 | 15.42 | 1 | 1 |
| 8 | F,2,f, | 880 | 1637 | 1486 | 1890 | 579 | 5.91 | 15.52 | 1 | 1 |
| 9 | F,2,b, | 0 | 1637 | 1310 | 2183 | 669 | 6.83 | 13.44 | 1 | 1 |
| 10 | F,2,r, | -880 | 1637 | 1134 | 2476 | 759 | 7.75 | 9.69 | 1 | 1 |
| 11 | F,2,3, | -1600 | 1637 | 990 | 2716 | 832 | 8.50 | 14.54 | 1 | 1 |
| 12 | F,3,r, | -880 | 1637 | 1134 | 2476 | 953 | 9.74 | 15.52 | 1 | 1 |
| 13 | F,3,b, | 0 | 1637 | 1310 | 2183 | 1101 | 11.25 | 13.44 | 1 | 1 |
| 14 | F,3,f, | 880 | 1637 | 1486 | 1890 | 1249 | 12.76 | 10.19 | 1 | 1 |
| 15 | F,3,4, | 1637 | 1637 | 1637 | 1637 | 1377 | 14.06 | 15.42 | 1 | 1 |
| 16 | F,4,f, | 880 | 1637 | 1486 | 1890 | 1589 | 16.23 | 15.52 | 1 | 1 |
| 17 | F,4,b, | 0 | 1637 | 1310 | 2183 | 1836 | 18.75 | 13.44 | 1 | 1 |
| 18 | F,4,r, | -880 | 1637 | 1134 | 2476 | 2082 | 21.27 | 9.91 | 1 | 1 |
| 19 | F,4,5, | -1616 | 1637 | 987 | 2722 | 2289 | 23.37 | 14.93 | 1 | 1 |
| 20 | F,5,r, | -880 | 1637 | 1134 | 2476 | 2630 | 26.86 | 15.52 | 1 | 1 |
| 21 | F,5,b, | 0 | 1637 | 1310 | 2183 | 3039 | 31.03 | 13.44 | 1 | |
| 22 | F,5,f, | 880 | 1637 | 1486 | 1890 | 3447 | 35.20 | | | |
| 1 CR | B,f,1, | 880 | 0 | 176 | -293 | 54 | 0.55 | 57.23 | 2 | |
| 2 CR | B,r,2, | -880 | 0 | -166 | 277 | 85 | 0.87 | 64.64 | | |
| 3 CR | B,f,3, | 880 | 0 | 166 | -277 | 140 | 1.43 | 66.67 | 2 | 1 |
| 4 CR | B,r,4, | -880 | 0 | -166 | 277 | 233 | 2.38 | 65.54 | 2 | |
| 5 CR | B,f,5, | 880 | 0 | 166 | -277 | 385 | 3.93 | | | |
| 1R | r,1,4 | -880 | -343 | -451 | -164 | -138 | -1.41 | 66.99 | 3 | 1 |
| 2R | f,2,5 | 880 | -344 | -99 | -752 | -231 | -2.35 | 16.98 | 2 | 1 |
| 3R | r,1,2, | -880 | -880 | -880 | -880 | -270 | -2.75 | 69.80 | 2 | 2 |
| 4R | f,2,3 | 880 | -901 | -545 | -1494 | -458 | -4.68 | 61.60 | 2 | 2 |
| 5R | r3,4 | -880 | -880 | -880 | -880 | -740 | -7.56 | 68.39 | 2 | |
| 6R | f,4,5 | 880 | -891 | -537 | -1482 | -1246 | -12.73 | | | |

FIG. 10

INPUT SPEED 2200 RPM,
FINAL DRIVE RATIO: 33.6 TO 1

23 SPEED FWD, 6 SPEED REV TRANSMISSION

| GEAR SELEC-TION | CLUTCH ACTIVE | SPEED SUN GEAR S1 RPM | SPEED RING GEAR R RPM | SPEED CAR-RIER C RPM | SPEED SUN GEAR S2 RPM | SPEED OUT-PUT RPM | SPEED VEH-ICLE KPH | SPEED CHG. % | NO. OF CLUTCH SWAPS GEAR TO GEAR | NO. OF CLUTCH SWAPS SKIP UP-SHIFT |
|---|---|---|---|---|---|---|---|---|---|---|
| 1 | f1,1,4 | 550.00 | 219.73 | 291.974 | 91.29 | 84.77 | 0.87 | 88.37 | 3 | 1 |
| 2 | f1,1,2 | 550.00 | 550.00 | 550 | 550.00 | 159.68 | 1.63 | 46.28 | 2 | 2 |
| 3 | f2,1,4 | 1515.56 | 605.47 | 804.551 | 251.55 | 233.58 | 2.39 | 19.71 | 2 | 2 |
| 4 | r1,2,3 | -550.00 | 539.43 | 301.117 | 963.10 | 279.61 | 2.86 | 57.42 | 1 | 1 |
| 5 | F,r2,1, | -1515.56 | 2365 | 1516.13 | 3874.10 | 440.17 | 4.50 | 13.93 | 1 | 1 |
| 6 | F,r1,1, | -550.00 | 2365 | 1727.34 | 3498.61 | 501.49 | 5.12 | 13.93 | 1 | 1 |
| 7 | F,f1,1, | 550.00 | 2365 | 1967.97 | 3070.83 | 571.35 | 5.83 | 10.73 | 1 | 1 |
| 8 | F,f2,1, | 1515.56 | 2365 | 2179.18 | 2695.34 | 632.67 | 6.46 | 8.53 | 1 | 1 |
| 9 | F,1,2, | 2365 | 2365 | 2365.00 | 2365.00 | 686.61 | 7.01 | 13.97 | 1 | 1 |
| 10 | F,f2,2, | 1515.56 | 2365 | 2179.18 | 2695.34 | 782.52 | 7.99 | 13.93 | 1 | 1 |
| 11 | F,f1,2, | 550.00 | 2365 | 1967.97 | 3070.83 | 891.53 | 9.10 | 13.93 | 1 | 1 |
| 12 | F,r1,2, | -550.00 | 2365 | 1727.34 | 3498.61 | 1015.73 | 10.37 | 10.73 | 1 | 1 |
| 13 | F,r2,2, | -1515.56 | 2365 | 1516.13 | 3874.10 | 1124.74 | 11.49 | 8.99 | 1 | 1 |
| 14 | F,2,3, | -2411.34 | 2365 | 1320.18 | 4222.47 | 1225.88 | 12.52 | 14.84 | 1 | 1 |
| 15 | F,r2,3, | -1515.56 | 2365 | 1516.13 | 3874.10 | 1407.83 | 14.38 | 13.93 | 1 | 1 |
| 16 | F,r1,3, | -550.00 | 2365 | 1727.34 | 3498.61 | 1603.96 | 16.38 | 13.93 | 1 | 1 |
| 17 | F,f1,3, | 550.00 | 2365 | 1967.97 | 3070.83 | 1827.40 | 18.66 | 10.73 | 1 | 1 |
| 18 | F,f2,3, | 1515.56 | 2365 | 2179.18 | 2695.34 | 2023.53 | 20.67 | 8.53 | 1 | 1 |
| 19 | F,3,4, | 2365 | 2365 | 2365.00 | 2365.00 | 2196.07 | 22.43 | 13.97 | 1 | 1 |
| 20 | F,f2,4, | 1515.56 | 2365 | 2179.18 | 2695.34 | 2502.82 | 25.56 | 13.93 | 1 | 1 |
| 21 | F,f1,4, | 550.00 | 2365 | 1967.97 | 3070.83 | 2851.49 | 29.12 | 13.93 | 1 | 1 |
| 22 | F,r1,4, | -550.00 | 2365 | 1727.34 | 3498.61 | 3248.71 | 33.18 | 10.73 | 1 | |
| 23 | F,r2,4, | -1515.56 | 2365 | 1516.13 | 3874.10 | 3597.38 | 36.74 | | | |
| 1R | r1,1,4, | -550.00 | -219.73 | -291.974 | -91.29 | -84.77 | -0.87 | 88.37 | 1 | 1 |
| 2R | r1,1,2, | -550.00 | -550.00 | -550 | -550.00 | -159.68 | -1.63 | 46.28 | 2 | 2 |
| 3R | r2,1,4, | -1515.56 | -605.47 | -804.551 | -251.55 | -233.58 | -2.39 | 19.71 | 2 | 1 |
| 4R | f1,2,3, | 550.00 | -539.43 | -301.117 | -963.10 | -279.61 | -2.86 | 57.36 | 2 | 2 |
| 5R | r2,1,2, | -1515.56 | -1515.56 | -1515.56 | -1515.56 | -440.00 | -4.49 | 16.07 | 3 | 2 |
| 6R | r1,3,4, | -550.00 | -550 | -550.00 | -550.00 | -510.71 | -5.22 | 50.86 | 2 | 1 |
| 7R | f2,2,3, | 1515.56 | -1486.43 | -829.745 | -2653.87 | -770.48 | -7.87 | 82.65 | 1 | |
| 8R | r2,3,4, | -1515.56 | -1515.56 | -1515.56 | -1515.56 | -1407.30 | -14.37 | | | |

FIG. 13

INPUT SPEED: 2200RPM
FINAL DRIVE RATIO:33.6 TO 1

22 SPD. FWD., 6 SPD. REV., 5 SPD. CREEP TRANSMISSION

| GEAR SELEC-TION | CLUTCH ACTIVE | SPEED SUN GEAR S1 RPM | SPEED RING GEAR R RPM | SPEED CAR-RIER C RPM | SPEED SUN GEAR S2 RPM | SPEED OUT-PUT RPM | SPEED VEH-ICLE KPH | SPEED CHG. % | NO. OF CLUTCH SWAPS GEAR TO GEAR | NO. OF CLUTCH SWAPS SKIP UP-SHIFT |
|---|---|---|---|---|---|---|---|---|---|---|
| 1 | f,1,4 | 830 | 322 | 423 | 152 | 119 | 1.43 | 67.09 | 3 | 1 |
| 2 | r,2,5 | -830 | 323 | 92 | 707 | 199 | 2.40 | 17.35 | 2 | 2 |
| 3 | f,1,2, | 830 | 830 | 830 | 830 | 233 | 2.81 | 26.84 | 2 | 2 |
| 4 | F,1,r, | -830 | 1524 | 1053 | 2308 | 296 | 3.57 | 15.77 | 1 | 1 |
| 5 | F,1,b, | 0 | 1524 | 1219 | 2032 | 343 | 4.13 | 13.62 | 1 | 1 |
| 6 | F,1,f, | 830 | 1524 | 1385 | 1755 | 390 | 4.69 | 10.02 | 1 | 1 |
| 7 | F,1,2, | 1524 | 1524 | 1524 | 1524 | 429 | 5.16 | 15.17 | 1 | 1 |
| 8 | F,2,f, | 830 | 1524 | 1385 | 1755 | 494 | 5.94 | 15.77 | 1 | 1 |
| 9 | F,2,b, | 0 | 1524 | 1219 | 2032 | 571 | 6.88 | 13.62 | 1 | 1 |
| 10 | F,2,r, | -830 | 1524 | 1053 | 2308 | 649 | 7.82 | 10.09 | 1 | 1 |
| 11 | F,2,3, | -1529 | 1524 | 913 | 2541 | 715 | 8.61 | 15.30 | 1 | 1 |
| 12 | F,3,r, | -830 | 1524 | 1053 | 2308 | 824 | 9.92 | 15.77 | 1 | 1 |
| 13 | F,3,b, | 0 | 1524 | 1219 | 2032 | 954 | 11.49 | 13.62 | 1 | 1 |
| 14 | F,3,f, | 830 | 1524 | 1385 | 1755 | 1084 | 13.05 | 10.02 | 1 | 1 |
| 15 | F,3,4, | 1524 | 1524 | 1524 | 1524 | 1193 | 14.36 | 15.17 | 1 | 1 |
| 16 | F,4,f, | 830 | 1524 | 1395 | 1755 | 1373 | 16.54 | 15.77 | 1 | 1 |
| 17 | F,4,b, | 0 | 1524 | 1219 | 2032 | 1590 | 19.15 | 13.62 | 1 | 1 |
| 18 | F,4,r, | -830 | 1524 | 1053 | 2308 | 1807 | 21.75 | 9.63 | 1 | 1 |
| 19 | F,4,5, | -1497 | 1524 | 920 | 2531 | 1981 | 23.85 | 14.51 | 1 | 1 |
| 20 | F,5,r, | -830 | 1524 | 1053 | 2308 | 2268 | 27.31 | 15.77 | 1 | 1 |
| 21 | F,5,b, | 0 | 1524 | 1219 | 2032 | 2626 | 31.61 | 13.62 | 1 | |
| 22 | F,5,f, | 830 | 1524 | 1385 | 1755 | 2983 | 35.92 | | | |
| 1 CR | B,f,1, | 830 | 0 | 166 | -277 | 47 | 0.56 | 66.67 | 2 | 1 |
| 2 CR | B,r,2, | -830 | 0 | -166 | 277 | 78 | 0.94 | 66.96 | 2 | 1 |
| 3 CR | B,f,3, | 830 | 0 | 166 | -277 | 130 | 1.56 | 66.67 | 2 | 1 |
| 4 CR | B,r,4, | -830 | 0 | -166 | 277 | 217 | 2.61 | 65.13 | 2 | |
| 5 CR | B,f,5, | 830 | 0 | 166 | -277 | 358 | 4.31 | | | |
| 1R | r,1,4 | -830 | -322 | -423 | -152 | -119 | -1.43 | 67.09 | 3 | 1 |
| 2R | f,2,5 | 830 | -323 | -92 | -707 | -199 | -2.40 | 17.35 | 2 | 1 |
| 3R | r,1,2, | -830 | -830 | -830 | -830 | -233 | -2.81 | 66.23 | 2 | 2 |
| 4R | f,2,3 | 830 | -827 | -496 | -1380 | -388 | -4.67 | 67.39 | 2 | 2 |
| 5R | r,3,4 | -830 | -830 | -830 | -830 | -650 | -7.82 | 69.03 | 2 | |
| 6R | f,4,5 | 830 | -845 | -510 | -1403 | -1098 | -13.22 | | | |

INPUT SPEED: 2000RPM
FINAL DRIVE RATIO: 28.5 TO 1

FIG. 15

MULTISPEED POWERSHIFT TRANSMISSION

This application claims benefit to provisional Application No. 60/071,656 filed Jan. 16, 1998 which claims benefit to provisional Application No. 60/075,180 filed Feb. 19, 1998.

FIELD OF INVENTION

The present invention relates to a multispeed mechanical transmission with an optional hydrostatic attachment, useful in, but not limited to agricultural tractors.

BACKGROUND OF THE INVENTION

The prior art is replete with various transmissions for agricultural tractors and the like. Multispeed transmissions having countershafts are widely used in the power train of tractor arrangements because a plurality of rotating clutch assemblies and associated gears can be positioned on parallel shafts to allow considerable flexibility in adapting them to different space requirements and "gear spacing".

"Gear spacing" is the ratio change between gears which produces the change in vehicle speed when the operator shifts to a different gear. The smaller this gear spacing the better the optimum engine speed can be matched to the optimum ground speed. The more gear selections that are available, the finer the gear spacing can be designed. However, the number of clutches and gears increases with added gear selections, increasing the cost, etc.

"Shift quality" is the operator's perception of how smoothly a transmission reacts when making a shift. Many factors affect shift quality, such as rapid changes in speed of elements with large inertia within the transmission, poor timing of the pressure control, large torque interruptions at heavy loads, large gear spacing, and most of all, the number of clutch "swaps" required from one gear selection to the next. (A single clutch swap is defined as the disengagement of one clutch and the engagement of another clutch to complete a shift.) All currently manufactured powershift transmission have multiclutch swaps during some shifts in the operating range. It is difficult, if not impossible, to make multiclutch swaps smooth because during a shift, one or more of the engaging clutches opposes the direction of the shift. For example, in one typical transmission, during a triple clutch swap upshift from $6^{th}$ to $7^{th}$ gear, one of the clutches shifts up while the other two clutches shift down.

Any sequence of clutch engagements will cause torque reversals. This effect is inherent in all multiswap shifts of current designs. Only single clutch swaps can be shifted smoothly by overlapping the engagement of oncoming clutch with the disengagement of the outgoing clutch.

There are special applications for the type of vehicle using the transmission described herein where exact speed control is important, such as trenching or certain planting and harvesting operations, among others. In many of these applications, most of the engine power is used to drive the mechanism of the towed attachment through the power take off (PTO) with only part of the power used for the forward motion of the vehicle. Here, transmission efficiency is of secondary importance, with the primary importance being the ability to vary the ground speed at small increments independently of the engine. In such cases, an continuously variable transmission is desirable. Continuous variability can be achieved, for example, through the use of hydrostatic units, in which case, transmission efficiency is sacrificed. Other continuously variable transmissions include electrical generator-motor sets or variable friction drives.

Two types of the continuously variable transmission are of interest:

1. Continuous variability from a certain minimum vehicle speed to the maximum vehicle speed with full power transmission capability in one mode of operation, and continuous variability from zero to a certain low vehicle speed with maximum traction capability in another mode of operation. In the full power mode a means (such as a clutch) must be available to start the vehicle in motion at full load. As pertains to the present invention, this type will be called a partial continuously variable transmission (PCVT).

2. Continuous variability from zero to maximum vehicle speed with full power and maximum traction capability within a single mode of operation. As pertains to the present invention, this type will be called a full continuously variable transmission (FCVT).

SUMMARY OF THE INVENTION

It is the object of the present invention to provide the largest known number of gear selections with a given number of clutches. For example, current transmissions with 9 clutches provide between 16 and 18 speeds forward with 4 to 6 reverse speeds. A typical arrangement of the present invention provides 23 forward and 8 reverse speeds using 9 clutches. These five extra speeds allow a closer gear spacing.

It is a further object of this invention to provide a variety of transmission systems from which to choose for specific applications.

It is a further object of the present invention to provide single clutch swaps for all single step and double step shifts throughout the normal operating range. Single step means sequential shifts and double step means skipping a gear selection.

It is a further object of the present invention to maximize the efficiency by keeping the number of gear meshes low. Also, the clutch sizes and speeds can be minimized for low losses.

It is a further object of the present invention to provide continuous variability of the type PCVT via an optional attachment. In this case, the present invention proposes the use of modulated clutches for starting the vehicle motion, thus allowing for the use of relatively small hydrostatic units.

It is a further object of the present invention to provide an alternate transmission system with continuous variability of the type FCVT. A continuously variable transmission from zero to maximum vehicle speed is realized by making the hydrostatic units large enough for sufficient torque to start the vehicle motion.

It is a further object of this invention to provide a compact transmission package using a unique gear, shaft, clutch and bearing arrangement.

General Description of the Basic Powershift Transmission

"Transmission" as used in this document is an arrangement of gears, shafts, clutches and bearings located in a housing for the purpose of transmitting rotational power, "input" meaning power absorbing, "output" meaning power delivering. The transmission system consists of an input transmission, a compound planetary system and an output transmission.

A compound planetary system is a planetary system consisting of at least two simple planetaries.(FIGS. 16, 17 and 18) There are two kinds of simple planetaries, the single and the double planetary. These are defined as follows.

A single planetary is comprised of a internal ring gear, a sun gear and a set of planets (usually three) which are rotatably mounted on sets of shafts anchored in a planet carrier. Each planet gear is in mesh with the ring gear and with the sun gear thus acting as an idler gear between the ring and the sun gear.

A double planetary is comprised of an internal ring gear, a sun gear and two sets of planet gears which are rotatably mounted on two sets of shafts each set of shafts being anchored in a planet carrier. One set of planets is in mesh with the ring gear and with the other set of planets which in turn is in mesh with the sun gear.

Another type of compound planetary system uses cluster planet gears. (as schematically represented in FIGS. 19, 20 and 21) Usually an equivalent planetary system of the first type described above can be constructed. The input transmission has one input member connected to the engine or motor and two output members each of which is selectively connectable to the input member by clutches through various gear ratios in forward and reverse. The output members are connected to the two input members of the compound planetary system.

The compound planetary system has two input members connected to the input transmission (as stated in the previous paragraph) and two output members connected to the output transmission.

The output transmission has two input members connected to two output members of the planetary system (as stated in the previous paragraph) and one output member connected to the rear and/or to the front wheel drive of the tractor. The output member is selectively connectable by clutches through various gear ratios to each of the two input members. Various accessory drives can be included wherever convenient to the input and output transmission.

BRIEF DESCRIPTION OF THE DRAWINGS

FIG. 2 is a chart illustrating a sequence of clutch combinations for the transmission system illustrated if FIG. 1;

FIG. 4 is a chart similar to FIG. 2 but illustrating a sequence of clutch combinations for the hydrostatic optional attachment illustrated in FIG. 3;

FIG. 7 is a chart similar to FIG. 4 but illustrating a sequence of clutch combinations for the full forward/reverse contiuously variable transmission system illustrated in FIG. 6;

FIG. 10 is a chart similar to FIG. 2 but illustrating a sequence of clutch combinations for the transmission system illustrated in FIG. 9;

FIG. 13 is a chart similar to FIG. 2 but illustrating a sequence of clutch combinations for the transmission illustrated in FIG. 12;

FIG. 15 is a chart similar to FIG. 2 but illustrating a sequence of clutch combinations for the transmission system illustrated in FIG. 14;

Figure 1:
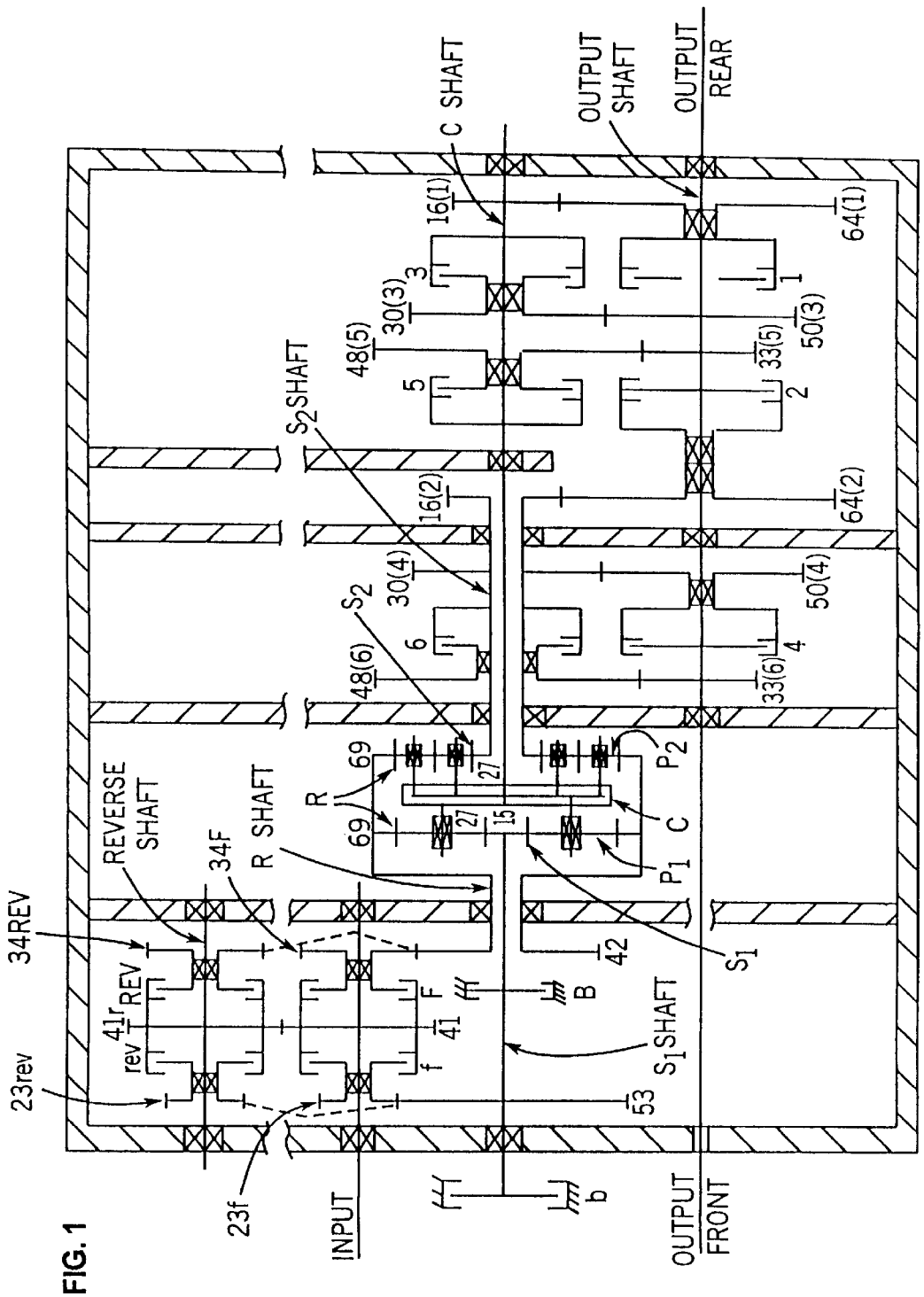
FIG. 1 is a schematic longitudinal sectional view of one form of transmission system according to the present invention.

Description of One Typical Embodiment of the Basic Powershift Transmission

In what follows, a specific transmission system (shown in FIG. 1) is described. It is understood, however, that the invention is not limited to this specific example. The compound planetary system consists of one ring gear R, two sun gears, $S_1$ and $S_2$, and one planet carrier C on which two sets of planets, $P_i$ and $P_O$, are rotatably mounted by two sets of shafts.

The input transmission of this system has two sets of three clutches. One set, denoted F, REV, and B, selectively connects the input shaft to the R shaft through various gears or it stops the R shaft. The other set, denoted f, rev, and b, selectively connects the input shaft to the $S_1$ shaft through various gears or it stops the $S_1$ shaft.

The output transmission has two sets of clutches. One set, denoted 1, 3, and 5, selectively connects the output shaft to the C shaft through three corresponding gear ratios. The other set, denoted 2, 4, and 6, selectively connects the output shaft to the $S_2$ shaft through three corresponding gear ratios.

The compound planetary systems shown in FIGS. 16, 17, 18 and 25 is incorporated in FIGS. 1, 3, 4, 5, 6, 8, 9, 11, 12, and 14. It is comprised of a single input planetary $P_i$ and a double output planetary $P_O$. The members of the two planetaries are connected as shown: The ring gear R of the planetary $P_i$ is connected to the ring gear of the planetary $P_O$, the carrier of the planetary $P_i$ is connected to the carrier C of the planetary $P_O$. The two input connections, R and $S_1$, are attached to the ring gear and to the sun gear of the planetary $P_i$, respectively, and the two output connections, C and $S_2$, are attached to the carrier and the sun gear of the output planetary $P_O$, respectively.

The compound planetary system has the following characteristics:

1. The ratio of speeds of any two of the four members (two input and two output members) determines the ratio of speeds of all members to each other.

2. At a constant speed of one input member (the ring gear R), as the other input member (the sun gear $S_1$) is varied from a negative speed to zero to a positive speed, the speed of one output member (sun gear $S_2$) decreases and the speed of the other output member (planet carrier C) increases. (Of course, as the sun gear $S_1$ is varied from a positive speed to zero to a negative speed, the speed of $S_2$ increases and the speed of C decreases.)

An alternate planetary system, equivalent to the one described above, is shown in FIGS. 19, 20, 21 and 26. The first planet set $P_i$ is made up of three cluster gears each having a gear on the left and a gear on the right. The gears on the left are in mesh with the ring gear R at the outside and with the first sun gear $S_1$ at the inside. The gears on the right are in mesh with the gears of the second planet set $P_O$. The second planet set $P_o$ is also in mesh with the second sun gear $S_2$. Both planet sets, $P_i$ and $P_O$, are rotatably mounted to the same carrier C.

A second alternate planetary system is shown in FIGS. 22, 23, 24 and 27. This compound planetary system is comprised of two single planetaries $P_i$ and $P_O$, each having a ring gear, a sun gear and planet gears rotatably mounted by sets of shafts in respective planet carriers. The members of the two planetaries are interconnected as shown: The ring gear of the planetary $P_i$ is connected to the carrier of the planetary $P_O$ and the carrier of the planetary $P_i$ is connected to the ring gear of the planetary $P_O$. The two input connections, R and $S_1$, are attached to the ring gear and to the sungear of planetary $P_i$, respectively. The two output connections, C and $S_2$, are attached to the ring gear and to the sun gear of planetary $P_O$, respectively.

Figure 28:
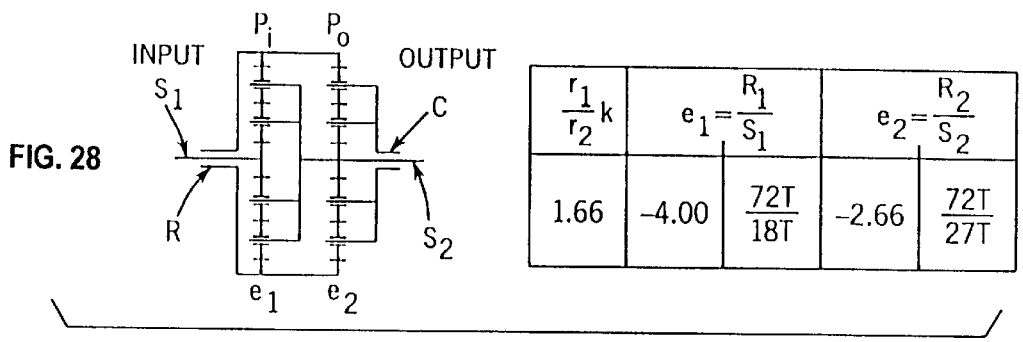

A third alternate planetary system is shown in FIG. 28. This compound planetary system is comprised of two double planetaries $P_i$ and $P_O$, each having a ring gear, a sun gear and planet gears rotatably mounted by sets of shafts in respective planet carriers. The members of the two planetaries are interconnected as shown: the ring gear of the planetary $P_i$ is connected to the ring gear of the planetary $P_O$ and the carrier of the planetary $P_i$ is connected to the sun gear of the planetary $P_O$. The two input connections, R and $S_1$, are attached to the ring gear and to the sun gear of planetary $P_i$, respectively. The two output connections, C and $S_2$, are attached to the carrier and to the sun gear of planetary $P_O$, respectively.

Figure 29:
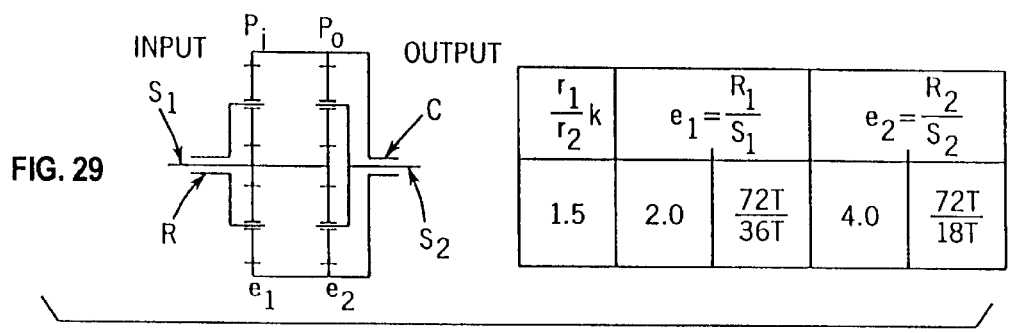

A fourth alternate planetary system is shown in FIG. 29. This compound planetary system is comprised of two single planetaries $P_i$ and $P_O$, each having a ring gear, a sun gear and planet gears rotatably mounted by sets of shafts in respective planet carriers. The members of the two planetaries are interconnected as shown: The ring gear of the planetary $P_i$ is connected to the ring gear of the planetary $P_O$ and the sun gear of the planetary $P_i$ is connected to the sun gear of the planetary $P_O$. The two input connections, R and $S_1$, are attached to the carrier and to the sun gear of planetary $P_i$, respectively. The two output connections, C and $S_2$, are attached to the ring gear and to the sun gear of planetary $P_O$, respectively.

Figure 30:
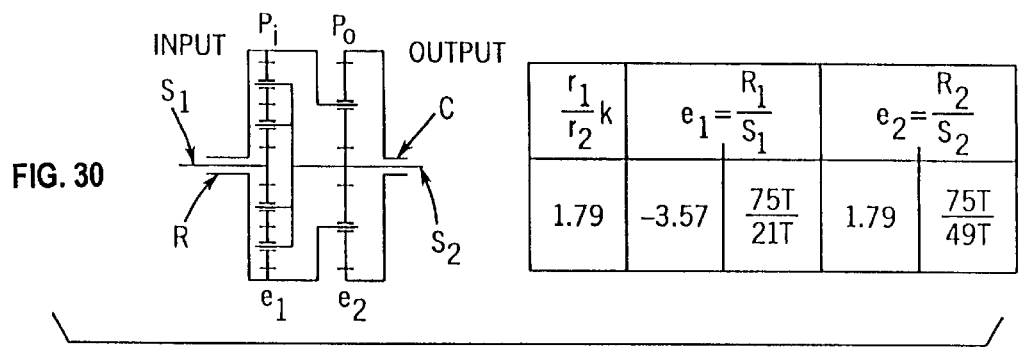
Figure 31:
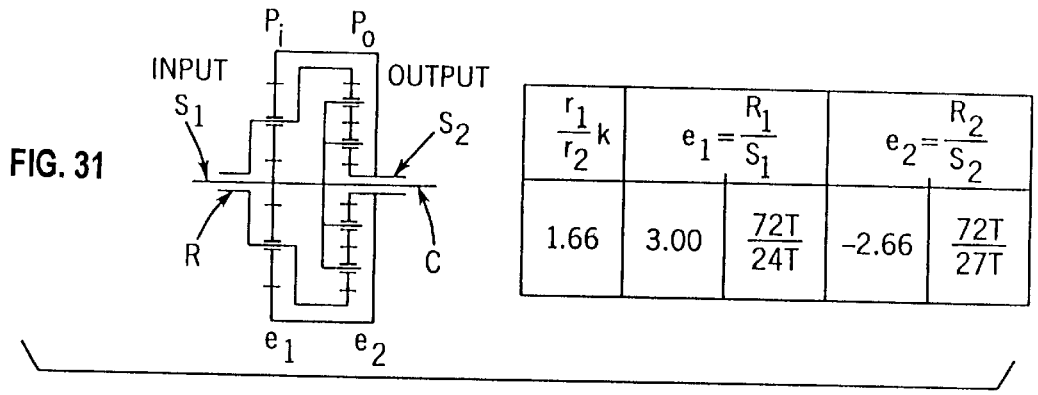
Figure 32:
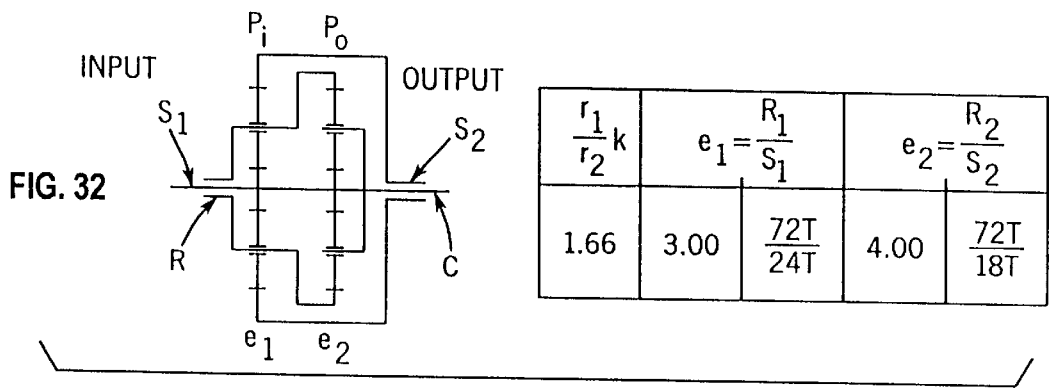

A fifth alternate planetary system is shown in FIG. 30. This compound planetary system is comprised of a double planetaries $P_i$ and a single planetary $P_O$, each having a ring gear, a sun gear and planet gears rotatably mounted by sets of shafts in respective planet carriers. The members of the two planetaries are interconnected as shown: The ring gear of the planetary $P_i$ is connected to the carrier of the planetary $P_O$ and the carrier of the planetary $P_i$ is connected to the sun gear of the planetary $P_O$. The two input connections R and $S_1$ are attached to the ring gear and to the sun gear of planetary $P_i$ respectively, and the two output connections C and $S_2$ are attached to the ring gear and to the sun gear of planetary $P_O$ respectively A sixth alternate planetary system is shown in FIG. 31. This compound planetary system is comprised of a single planetaries $P_i$ and a double planetary $P_O$, each having a ring gear, a sun gear and planet gears rotatably mounted by sets of shafts in respective planet carriers. The members of the two planetaries are interconnected as shown: The ring gear of the planetary $P_i$ is connected to the sun gear of the planetary $P_O$ and the carrier of the planetary $P_i$ is connected to the ring gear of the planetary $P_O$. The two input connections R and $S_1$ are attached to the carrier and to the sun gear of planetary $P_i$ respectively, and the two output connections C and $S_2$ are attached to the carrier and to the sun gear of planetary $P_O$ respectively A seventh alternate planetary system is shown in FIG. 32. This compound planetary system is comprised of a single planetary $P_i$ and a single planetary $P_O$, each having a ring gear, a sun gear and planet gears rotatably mounted by sets of shafts in respective planet carriers. The members of the two planetaries are interconnected as shown: The carrier of the planetary $P_i$ is connected to the ring gear of the planetary $P_O$ and the sun gear of the planetary $P_i$ is connected to the sun gear of the planetary $P_O$. The two input connections R and $S_1$ are attached to the carrier and to the sun gear of planetary $P_i$ respectively, and the two output connections C and $S_2$ are attached to the carrier of the planetary $P_O$ and to the ring gear of planetary $P_i$, respectively.

Figure 33:
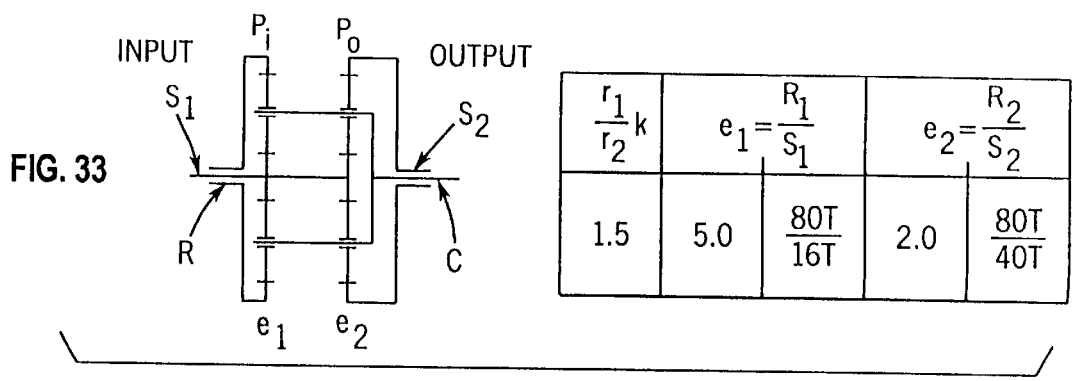
Figure 34:
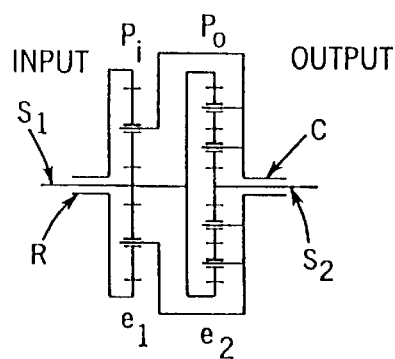

An eighth alternate planetary system is shown in FIG. 33. This compound planetary system is comprised of a single planetaries $P_i$ and a single planetary $P_O$, each having a ring gear, a sun gear and planet gears rotatably mounted by sets of shafts in respective planet carriers. The members of the two planetaries are interconnected as shown: The carrier of the planetary $P_i$ is connected to the carrier of the planetary $P_O$, and the sun gear of the planetary $P_i$ is connected to the sun gear of the planetary $P_O$. The two input connections R and $S_1$ are attached to the ring gear and to the sun gear of planetary $P_i$ respectively. The two output connections C and $S_2$ are attached to the carrier and to the ring gear of planetary $P_O$, respectively A ninth alternate planetary system is shown in FIG. 34. This compound planetary system is comprised of a single planetaries $P_i$ and a double planetary $P_O$, each having a ring gear, a sun gear and planet gears rotatably mounted by sets of shafts in respective planet carriers. The members of the two planetaries are interconnected as shown: the carrier of the planetary $P_i$ is connected to the carrier of the planetary $P_O$, and the sun gear of the planetary $P_i$ is connected to the ring gear of the planetary $P_O$. The two input connections, R and $S_1$, are attached to the ring gear and to the sun gear of planetary $P_i$, respectively. The two output connections, C and $S_2$, are attached to the carrier and to the sun gear of planetary $P_O$, respectively In the following description power flow may be positive or negative.

The input transmission absorbs engine power through the input shaft, transmitting power selectively through two pairs of clutches to the two input members, $S_1$ and R, of the compound planetary. The first pair of clutches is denoted f and F, and the second pair is denoted rev and REV.

The first pair of clutches is mounted on the input shaft to selectively drive the ring gear R through clutch F, via a gear set 34F to 42, and to selectively drive the sun gear $S_1$ through clutch f, via a gear set 23f to 53.

The second pair of clutches is mounted on the reverse shaft. This shaft is driven through a 41 to 41r gear set from the input shaft. The reverse shaft is located such that the 34Rev gear is in mesh with the 42 gear and the 23rev gear is in mesh with the 53 gear. Thus, the selective engagement of the clutches REV and rev will respectively drive the ring gear R and the sun gear $S_1$ in the opposite direction at the same speeds as the F and f clutches.

In addition to these two pairs of clutches, there are two clutches B and b. Engagement of B will stop the ring gear R and of b will stop the sun gear $S_1$.

The output transmission absorbs power selectively through two shafts $S_2$ and C. Power is transmitted through either one shaft or the other or through both shafts in certain proportions. The shafts of both $S_2$ and C have clutches mounted on them which in combination with the clutches mounted on the output shaft provide three selective gear ratios each from $S_2$ to the output shaft and from C to the output shaft. The even numbered clutches, 2, 4 and 6, selectively connect the $S_2$ shaft to the output shaft at certain ratios provided by the gear sets 16(2) to 64(2), 30(4) to 50(4) and 48(6) to 33(6), respectively. The odd numbered clutches, 1, 3 and 5, selectively connect the C shaft to the output shaft at certain ratios provided by the gear sets 16(1) to 64(1), 30(3) to 50(3) and 48(5) to 33(5), respectively.

To establish a connection from the engine to the output shaft of the output transmission either:

(1) Two input clutches and one output clutch must be engaged, or (2) One input clutch and two output clutches must be engaged.

(1) Two input and one output clutches engaged:

Two input clutches are engaged, one driving the ring gear R at a certain ratio with respect to the engine, and one driving the sun gear $S_1$ at a certain other or same ratio with respect to the engine, will establish a ratio of two members of the planetary system; also one input clutch F or REV driving the ring gear R with the sun gear $S_1$ stopped (b engaged), or one input clutch f or r driving the sun gear $S_1$ with the ring gear R stopped (B engaged), will establish a ratio of two members R and $S_1$ of the planetary system. Then by Item (1) on page 4, the ratios of all members of the planetary system are established. Thus, the engagement of any one clutch (1, 2, 3, 4, 5, or 6) in the output transmission will establish an overall ratio from the input (engine) to the output of the transmission system.

(2) One input and two output clutches engaged:

Two output clutches engaged, with one of the clutches 2, 4, or 6 connecting the sun gear $S_2$ to the output shaft of the output transmission at a certain ratio, and one of the clutches 1, 3, or 5 connecting the carrier C to the output shaft at a certain other or same ratio, will establish a ratio between $S_2$ and C. Again, by Item (1) on page 4, the ratios of all members of the planetary system are established. Thus, the engagement of any one input clutch, F or Rev, which connects the engine to the ring gear R, or any one input clutch f or rev, which connects the engine to the sun gear $S_1$, will establish a ratio from the engine to the output shaft of the transmission system.

Engaging the clutches as in either (1) or (2) above establishes a "gear" for the transmission system. The number of possible "gears" is the total number of possible combinations in (1) and (2). Thus, F and rev combined with 6 output clutches=6 forward "gears", REV and rev combined with 6 output clutches=6 reverse, F and b combined with 6 output clutches=6 forward, REV and b combined with 6 output clutches=6 reverse, F and f combined with 6 output clutches=6 forward, REV and f combined with 6 output clutches=6 reverse, f and B combined with 6 output clutches=6 forward, rev and B combined with 6 output clutches=6 reverse, F at input combined with 9* combinations at output=9 forward, REV at input combined with 9* combinations at output=9 reverse, f at input combined with 9* combinations at output=9 forward, rev at input combined with 9* combinations at output=9 reverse

* The 9 combinations at output are: 1-2, 1-4, 1-6, 2-3, 2-5, 3-4, 3-6, 4-5, 5-6.

Thus, there are 42 forward "gears" and 42 reverse "gears" possible in the transmission schematically illustrated in FIG. 1.

In order to provide single clutch swap shifts, a certain sequence of clutch combinations for each "gear" is chosen, as shown in column 2 of FIG. 2. By selecting certain gear ratios for all gears in the system it is possible to provide reasonably equal geometric steps (11+ or −2 % shown as % speed change in column 9 in FIG. 2) from one gear selection to the next by choosing the sequence shown in FIG. 2. Note that some of the possible combinations of clutches are not used because they either provide redundant speeds or they will not fall within the single clutch swap sequence. Thus, from the 42 possible combinations available only 33 are used.

FIG. 1 schematically illustrates the various clutches engaged in each gear selection (column 2) with the corresponding speeds of each shaft in the typical transmission described. Note the clutch REV and the clutch B are considered optional at added cost. The "standard" transmission has only 27 speeds forward and 9 speeds reverse. The addition of the clutch REV will make these 9 speeds reverse redundant. Therefore, a 27 speed forward and 27 speed reverse will result by adding the REV clutch. The addition of the clutch B will add 6 forward and 6 reverse speeds. These 6 speeds are the creep option for applications at very low vehicle speeds.

General Comments on the Basic Powershift Transmission

Planetary systems, which exhibit the characteristics as described above, may be currently in use or described in existing patents. It is the idea of this invention to combine a planetary system having these characteristics with an input transmission and an output transmission, each having a plurality of selectable gear ratios.

It is an additional idea to design the compound planetary system with two input means and two output means, to design the input transmission with one input and two output means and to design the output transmission with two input and one output means.

It is an additional idea to select from a number of planetary systems the one that is best for the particular application, depending on the speed range to be covered, the number of gear selections, manufacturing capabilities, space limitations, etc.

It is an additional idea of this invention to design the input transmission to provide two output means, each of which has a forward-reverse symmetry with or without a zero speed (lock) between forward and reverse. Thus, there is an equal reverse gear ratio corresponding to every forward gear ratio for each of the output means which are selectively connectable to two input means of the planetary system. (It is understood, however, that this forward-reverse symmetry is not a requirement).

It is an additional idea of this invention to design the output transmission to provide two input means, each of which has several gear ratios connectable to the output shaft of the transmission system.

It is an additional idea to select the gear ratios in the planetary system such that the following differential equation is essentially* met:

*Note: Since all gear ratios are ratios of integral numbers the above equations may only be approximated.

$$r_2 \frac{ds_1}{ds_1} = -Kr_1 \frac{de}{ds_1},$$

with the constraint
R=constant,
$S_2 r_2 = KCr_1$
at $S_1=0$,
where
$S_2$ is the speed of one output member of the planetary system,
$r_2$ is the lowest selectable gear ratio between the sun gear $S_2$ and the output shaft of the transmission system,
C is the speed of the other output member of the planetary system,
$r_1$ is the lowest selectable gear ratio between the carrier C and the output shaft of the transmission system,
$S_1$ is the speed of the input member of the planetary system, which is selectively connectable to the engine at one or more ratios in forward and reverse,
R is the speed of that input member of the planetary system, which is connected to the engine at a constant gear ratio through a clutch, which remains engaged during shifting in the normal operating range,
K is a constant calculated by the following equation:

$$K = \left(\frac{H}{L}\right) \exp\left(\frac{1}{N_0 - 2 + \frac{2Ns}{Ns+1}}\right),$$

Note: exp. means that the number in the second brackets is the exponent to the number in the first brackets.
where
H is the highest desired rated output speed of the transmission system,
L is the lowest desired rated output speed to be attained in the normal operating range (this is the range in which the clutch F remains engaged),
$N_0$ is the number clutches in the output transmission,
$N_s$ is the number of clutches in the set which selectively connects the engine through gear ratios to the input member $S_1$.

It is an additional idea of this invention to make the geometric steps from one gear selection to the next equal to each other in a certain interval. For an odd number $N_s$ of clutches connectable to the sun gear $S_1$, this interval is from the gear in which two output clutches are engaged to the higher gear in which the sun gear $S_1$ is stopped. (As seen in FIG. 2, the step from the gear selection F 12 to F 2 f is equal to the step from the gear selection F 2 f to F 2 b. In the case of an even number of clutches connectable to the sun gear $S_1$, the interval is from the gear in which two output clutches are engaged to the first gear in which the direction of the speed of the sun gear $S_1$ is changed. (As seen in FIG. 13, the step from F 12 to F 2 $f_2$ is equal to the step from F, 2, $f_2$, to F, 2, $f_1$, and equal to the step from F, 2, $f_1$, to F, 2, $r_1$. Note that in the last step the direction of $S_1$ is changed from $f_1$, to $r_1$). This choice of steps will provide the best compromise for gear spacing throughout the total range of the transmission system.

It is an additional idea of this invention to design the gear ratios in each branch of the output transmission such that a geometric progression results with the common ratio equal to $K^2$, where K is defined above. Thus, the consecutive gear ratios in the branch associated with $r_1$ are
$r_1, r_1 K^2, r_1 K^4, \ldots$
and those ratios in the branch associated with $r_2$ are
$r_2, r_2 K^2, r_2 K^4, \ldots$ It is an additional idea of this invention to utilize the speed ratios which are available by engaging two clutches of the output transmission in combination with one clutch of the input transmission. This increases the number of "gears" available for a given total number of clutches with respect to conventional countershaft transmissions. This also allows for a shift sequence with single clutch swap shifting.

It is an additional idea of this invention to make use of the forward-reverse symmetry of the input transmission and the feature of engaging two clutches of the output transmission simultaneously as described above to provide a powershift transmission system with the unique feature of single clutch swap shifting for all sequential shifts and skip shifts. For a "range shift" (meaning the sequential shift into a "gear" in which two output clutches are engaged), the single clutch swap shift is accomplished by matching the ratios in the output transmission and in the input transmission to the planetary system such that the speed ratios provided by the engagement of two output clutches and one input clutch (F) falls in between the speed ratios provided by the engagement of one of the two output clutches combined with two input clutches and (in between) the engagement of the other of the two output clutches combined with the same two input clutches. Thus, the engagement of the output clutches 1 and 2 combined with the input clutch F provides a speed ratio in between the engagement of output clutch 1 combined with input clutches F and f, and the engagement of output clutch 2 combined with the same input clutches F and f. Similarly, F 23 falls between F 2 r and F 3 r.

To show the versatility of the concept of this invention, four variations of a transmission for different applications are schematically illustrated in FIGS. 1, 9, 12 and 14 with their resultant outputs being schematically represented in FIGS. 2, 10, 13 and 15 respectively.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of this invention.

General Description of the Continuously Variable (Hydrostatic) Options

In the description below the continuously variable element is referred to as the hydrostatic transmission. It is understood that other continuously variable system such as electrical generator-motor sets or variable friction drives could be used in place of hydrostatic units.

Figure 3:
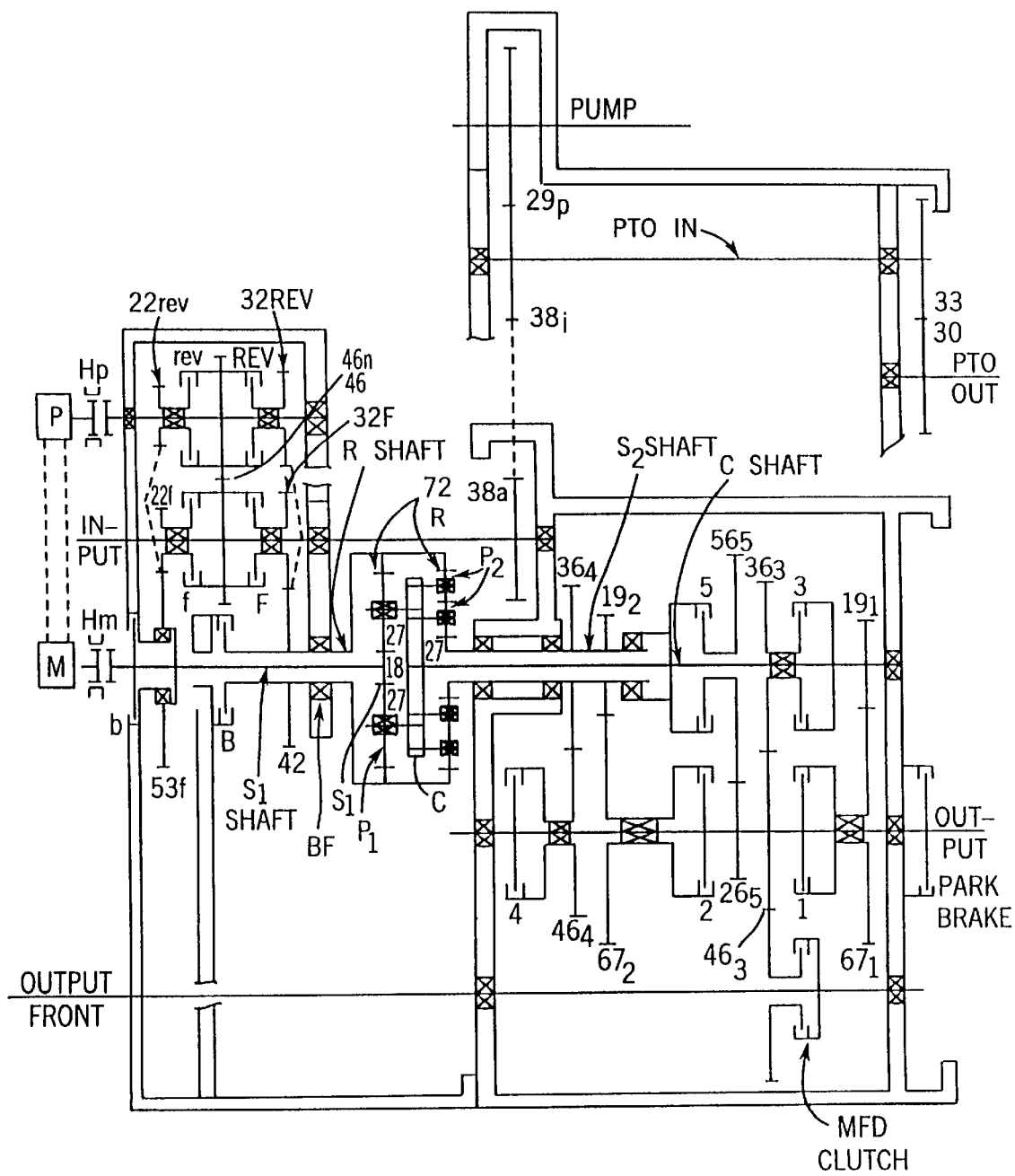
FIG. 3 is a schematic longitudinal sectional view similar to FIG. 1 but showing a hydrostatic optional attachment for the transmission stystem illustrated in FIG. 1.

Two hydrostatic options are described below:

(1) Add-on option (PCVT):

A low cost option requiring relatively small hydrostatic units with minor changes on the transmission to install the units provides continuous variability over two ranges of operating speeds, one range from a certain low speed to maximum speed at ful power capacity and the other from a certain low reverse speed through zero to a certain low forward speed at full tractive load capacity. The first range requires the gradual engagement of a master clutch to start the vehicle motion, if the startup load is higher than say 53% of the vehicle weight. (53% of the weight is the amount for a specific example shown on Chart 1H line PH 1, 2) After the master clutch is fully engaged continuous variability over the full hydromechanical range from a certain low speed to maximum speed is available at full load or full power capacity. For the second range there are gear selections available which provide full load continuously variable capacity from a certain low reverse speed through zero to a certain low forward speed, but the vehicle must be stopped to shift from these low speed gear selections to the gear selection for the first range. On FIG. 3 schematically illustrates the gear selection for the first range are designated hydromechanical (HM) and for the second range pure hydrostatic (PH). Note a shift from the pure hydrostatic range PH 1, 2 to the hydromechanical range PM 1 or PM 2 can be made at the $S_1$ speed of 1523.82 rpm by engaging the F clutch, which is at synchronism at this speed.

(2) Substitution option (FCVT):

Larger hydrostatic units can be added which provide full load startup capacity by gradually increasing the displacement of the variable hydrostatic unit, but due to the space limitations these units can not be used as an "add-on" feature to the standard powershift transmission.

Description of One Typical Embodiment of the PCVT (Add-On Option)

The transmission system consists of the powershift version as described above, with the addition of an continuously variable transmission, installed such that the input member $S_1$ to the planetary system can be selectively connected to the engine through this continuously variable transmission.

In the description below a specific transmission system (shown in FIGS. 3, 4 and 5) is described for simplification. It is understood, however, that the invention is not limited to this specific example.

The system has two modes of operations: The mechanical powershift mode and the hydrostatic mode. The mechanical powershift mode is described above and will not be described here.

The hydrostatic mode functions in the following manner. The input transmission of this system has two sets of three clutches. One set, denoted F, B, and Rev, selectively connects the input shaft to the R shaft through various gears, and the other set, denoted f, b, rev, selectively connects the input shaft to the $S_1$ shaft through various gears. This set, f, b, rev, is inactive in the hydrostatic mode. In its place a fixed displacement hydrostatic unit (M) is connected to the $S_1$ shaft by moving the shift collar (HM) rightward, and a variable displacement hydrostatic unit (P) is connected to the reverse shaft by moving the shift collar (HP) rightward.

The compound planetary system is described hereinabove.

In the following description the flow of power may be positive or negative. The input transmission absorbs engine power through the input shaft, transmitting power selectively through one of a set of clutches (F or REV) to the first input member R of the compound planetary. The clutch (F) is mounted on the input shaft to selectively drive the ring gear R, via a gear set 32(F) to 42.

The clutch (REV) is mounted on the reverse shaft. This shaft is driven through a 46 to 46r gear set from the input shaft. The reverse shaft is located such that the 32(Rev) gear is in mesh with the 42 gear. Thus the selective engagement of the REV clutch will drive the ring gear R correspondingly in the opposite direction at the same speed as the F clutch. In addition to the two clutches (F and REV), there is the clutch B. Engagement of B will stop the ring gear R from rotation.

The sun gear $S_1$ is driven by the hydrostatic transmission at a variable speed from a certain maximum reverse speed to a certain maximum forward speed.

The output transmission absorbs power selectively through two shafts $S_2$ and C. The clutches mounted on the C-shaft and on the output shaft, provide two selective gear ratios from $S_2$ to the output shaft and three selective gear ratios from C to the output shaft. The even numbered clutches 2 and 4 are selectively connecting the $S_2$ shaft to the output shaft at ratios of 19(2) to 67(2), and 36(4) to 46(4), respectively. The odd numbered clutches 1, 3 and 5 are selectively connecting the C shaft to the output shaft at ratios of 19(1) to 67(1), 36(3) to 46(3) and 56(5) to 26(5), respectively.

To establish a connection from the engine to the output shaft of the output transmission either, one of the input clutches (F, B, or REV) plus the hydrostatic transmission in addition to one of the output clutches must be connected, or, two output clutches must be engaged plus either the hydrostatic transmission or one of the input clutches (F or REV). Thus, there are four modes of operation:

1. The low speed, pure hydrostatic (PH) mode with the clutch B engaged has five ranges, each providing continuous variability from a certain maximum reverse speed through zero speed to the same maximum forward speed as the hydrostatic transmission is varied from a maximum reverse speed through zero speed to the same maximum forward speed. To initially start the vehicle motion in this mode the clutch B and the output clutch for the particular maximum end speed are engaged after the hydrostatic transmission has been set to neutral (zero speed). Now the hydrostatic transmission can be moved to forward or reverse at any desired rate.

2. The normal hydromechanical (HM) forward speed mode with the clutch F engaged has five ranges, each providing continuous variability from a certain minimum forward speed to a certain maximum forward speed as the hydrostatic transmission ratio is varied from a maximum speed in one direction through zero speed to a maximum speed in the other direction. To provide continuous variability over the total normal forward speed range a shift in the range transmission is made at the point of synchronism of two adjacent clutches. (The point of synchronism is the hydrostatic speed at which either of two output clutches provide the same system output speed.) Thus, starting with clutch 1 engaged, the hydrostatic transmission is varied from a maximum reverse speed through zero speed to a certain forward speed at which the relative speed in the friction elements of the clutch 2 is zero. At this point the shift from clutch 1 to clutch 2 is made. To further increase the vehicle speed the hydrostatic transmission is varied from the shiftpoint-speed back through zero to a certain reverse speed at which synchronous speed in clutch 3 is reached. At this point the shift from clutch 2 to clutch 3 is made. To further increase the vehicle speed the hydrostatic transmission is varied from the shiftpoint-speed back through zero to a certain forward speed, at which another range shift can be made at synchronism. From this progression it follows that the total vehicle speed range is continuously variable. It is assumed that sensors linked to a computer will sense the shiftpoint and perform the shift automatically. To initially start the vehicle motion a certain vehicle speed up to a certain maximum is preselected by the operator. Based on this selection the computer will set the hydrostatic unit, engage the F clutch and select the applicable output clutch (1 or 2). The output clutch pressure will be automatically modulated at a certain rate to provide a smooth transition from standstill to the preselected speed. Alternately the operator can override the automatic rate of modulation by pushing the clutch pedal to control the rate of clutch engagement at will.

3. The normal HM reverse speed mode with the clutch REV engaged in place of the clutch F mirrors the normal forward speed mode.
4. Two output clutches engaged with the hydrostatic transmission driving the input in the PH mode: There are 6 combinations of two output clutches engaged providing 6 continuously variable ranges from a maximum vehicle reverse speed through zero to a maximum vehicle forward speed. To initially start the vehicle motion in this mode both clutches for the particular maximum end speed are engaged after the hydrostatic transmission has been set to neutral (zero speed). Now the hydrostatic transmission can be moved into forward or reverse at any desired rate.

FIG. 4 schematically illustrates the various speeds within the transmission system at various input conditions.

Column 1 of FIG. 4 shows the mode of operation, either PH or HM. The PH modes provide an continuously variable range from the maximum vehicle forward speed, indicated in column 8, through zero to the same maximum vehicle reverse speed. The HM modes provide continuous variability from the lowest speed (2.93 kph) to the highest speed (40.95 kph), however, range shifts are required at the shift points.

Column 2 of FIG. 4 indicates these shift points at the speeds wherever one or another output clutch is shown on the same line. In order to provide reverse speeds in the hydromechanical mode the reverse clutch REV must be engaged in place of the forward clutch F.

Column 3 of FIG. 4 shows the speeds of the $S_1$ shaft (fixed hydrostatic unit) required to provide the output speeds shown in column 7. The speed of the fixed unit M is varied by changing the output flow of the variable unit P. In the specific example the variable hydrostatic unit P connected to the reverse shaft has the same maximum displacement per revolution as the fixed hydrostatic unit M. Since the variable unit runs at engine speed, the fixed unit M runs at about 90% of engine speed at maximum hydrostatic pressure (10% of the speed is lost due to leakage). Thus the maximum speeds shown in column 3 are at 1800 rpm. Note: the shiftpoint speeds are at about 1500 rpm. It is assumed that speed sensors linked to a computer will perform the shift, thus the operator will not be aware of the change from one range to the next.

Columns 4 through 6 of FIG. 4 show the speeds of the members in the planetary system.

Column 9 shows the ratio of the available drawbar pull to the traction limit of the machine with sufficiently large hydrostatic units to transmit full engine power in the HM mode. The PH modes, however, show relatively low ratios. Only at maximum vehicle speeds of less than 3.14 kph is the pull to traction ratio greater than 1. This implies that a synchronous shift from the PH mode to the HM mode can not be made at maximum tractive load since this shift must be made from the clutch selection 1, 2. As evident from a review of Column 2 of FIG. 2, a shift made from the clutch selection 1, 2 only provides a pull of 53% (column 9) of traction. Therefore a high energy clutch must be gradually engaged to start the vehicle motion in a preselected hydromechanical range whenever the ratio of pull to traction is greater than 0.53. Thus, if there is no need to pick up the load hydrostatically from standstill of the vehicle, then a small hydrostatic transmission is sufficient. Since large clutches with modulation capability are required for the powershift version of the transmission system they can also be utilized as energy absorbing clutches for the hydrostatic version to start the vehicle motion by modulation.

Column 10 of FIG. 4 shows the ratio of the available drawbar pull to the traction limit with sufficiently large hydrostatic units to provide a ratio of 1.30 in the pure hydrostatic selection 1,2. From this selection a synchronous shift can be made at 1523.81 rpm by engaging the clutch F and then disengaging the clutch 1. Thus a continuously variable transmission (CVT) results.

Figure 5:
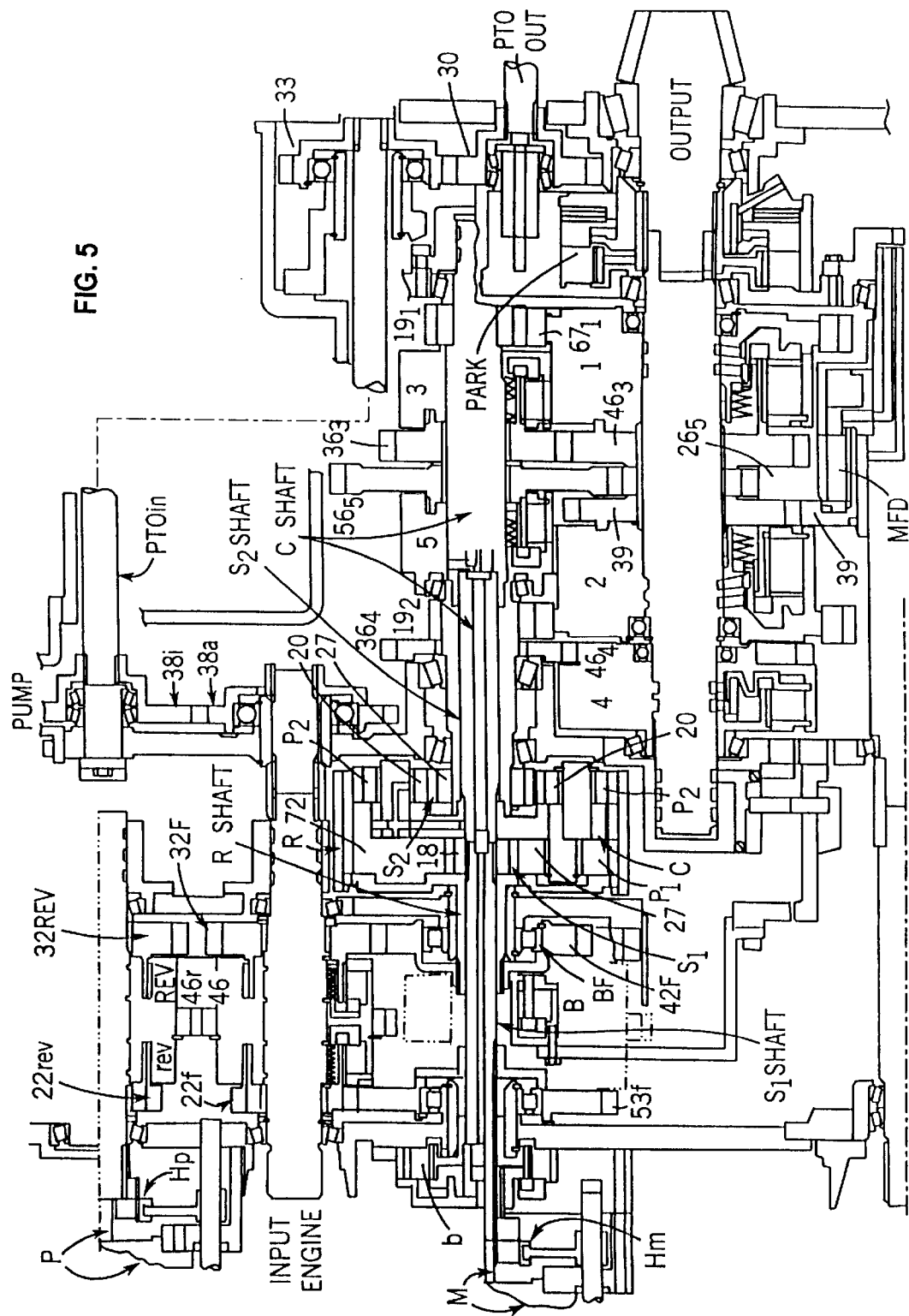
FIG. 5 is a longitudinal sectional view of the transmission system schematically illustrated in FIG 3.
Figure 6:
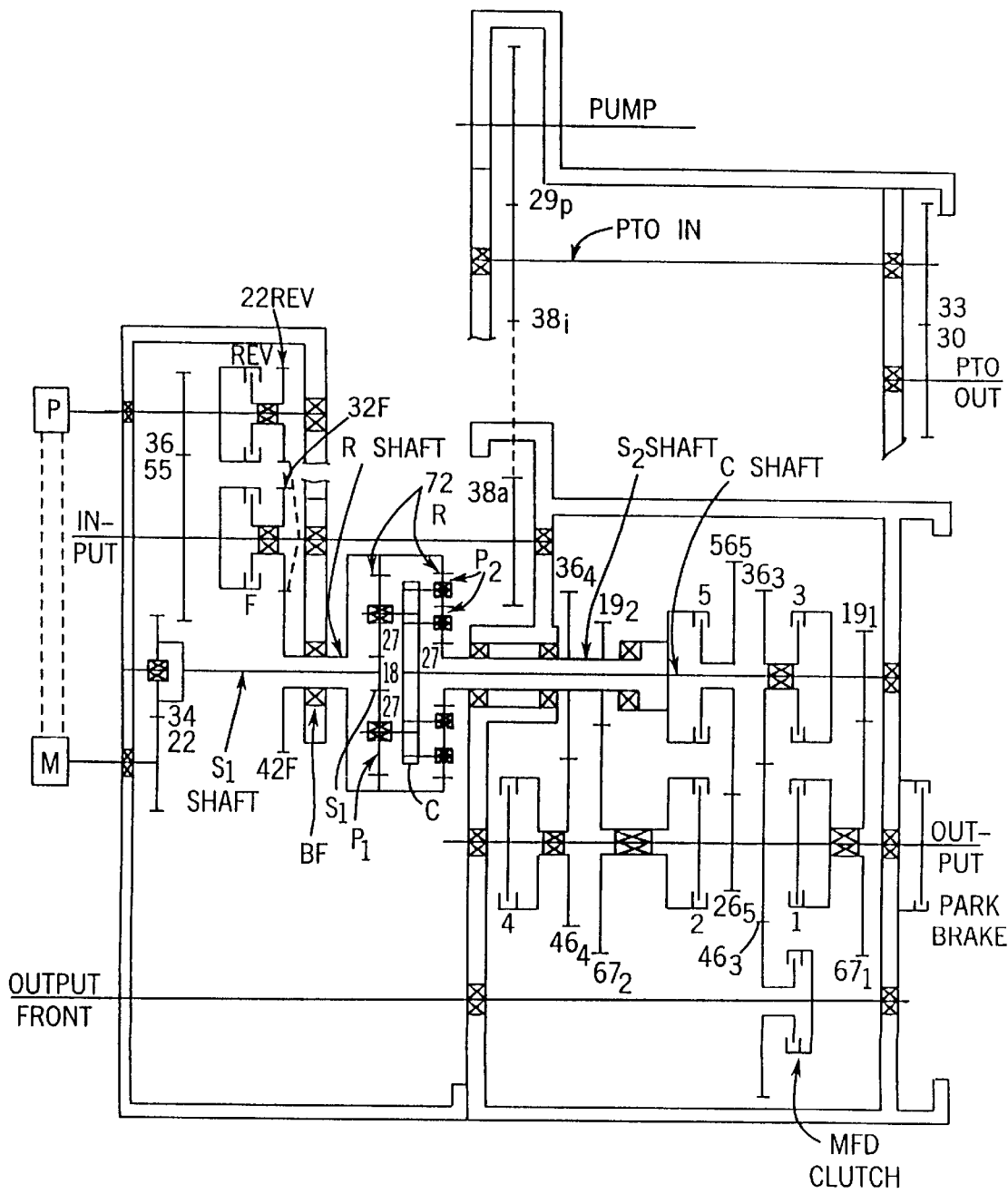
FIG. 6 is a schematic longitudinal sectional view similar to FIG. 3 but showing a full forward/reverse continuously variable transmission system.

FIG. 5 schematically represents a realistic gear, shaft, bearing and housing arrangement for the transmission illustrated in FIG. 1.

Description of One Typical Embodiment of the FCVT (Substitution option)

In the following description a specific CVT (shown in FIG. 6, 7 and 8) is described for simplification. It is understood, however, that the invention is not limited to this specific example.

In this system the f, rev, b, and the B clutches with their corresponding gears have been removed from the input transmission of the powershift version. In their place a gear set (22, 34) to drive the hydrostatic unit M has been added and the gear ratio (36, 55) to drive the reverse shaft has been added, plus the REV gear 22REV has been added. In effect the displacement of the hydrostatic units has been increased due to their higher operating speed with respect to the units mounted as shown on FIG. 1. Additionally the displacement per revolution must be increased to provide sufficient hydrostatic torque for the traction limit of the vehicle.

FIG. 7 schematically represents that the CVT can operate at any speed from 0 to 40.95 kph. There are 4 shift points as indicated in column 2 wherever one or another output clutch are shown on the same line.

At these shift points a shift between the two clutches shown on the particular line can be made at synchronism. In other words either clutch will provide the same vehicle speed at the speed of the sun gear $S_1$ indicated on the line (column 3 of FIG. 7).

Since the shifts can be made at synchronism all friction clutches could be replaced by jaw clutches. The choice becomes a matter of economics including the control system which must be more accurate to sense the speeds of synchronism. The friction clutches are more forgiving than the jaw clutches, however, they generate higher power losses thus affecting the efficiency adversely. The friction clutches can be made with fewer discs at higher clamping forces and lower cooling flow, since they need not absorb high energy and therefore the losses can be minimized.

Column 10 on FIG. 7 indicates the effect of the larger hydrostatic units in the pure hydrostatic (PM) modes with respect to column 9 (smaller units). In column 10 the ratio of pull available to traction is greater than 1 (1.30), when the clutches 1 and 2 are engaged, thus the vehicle can reach the shiftpoint under the highest normal load condition. If for some reason the traction is unusually high, say the tires are frozen to the ground, the pure hydrostatic selection 14 can be made which will more than double the available pull (2.16), however, no synchronous shift can be made from this selection. The vehicle must be stopped, and 1, 2 must be selected for continuous variability from zero speed.

Figure 8:
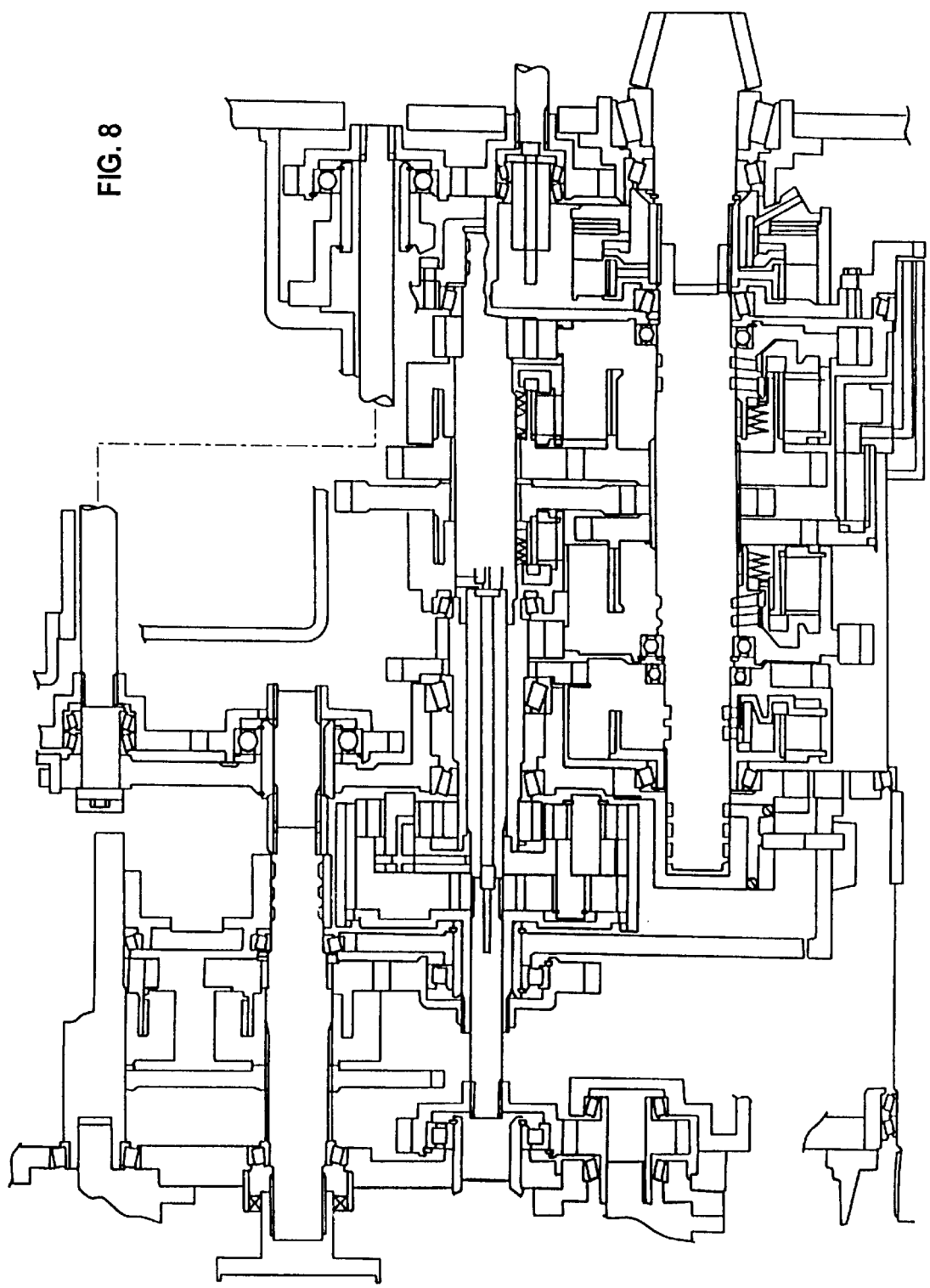
FIG. 8 is alongitudinal sectional view of the transmission system schematically illustrated in FIG. 6.

FIG. 8 schematically represents a realistic gear and bearing arrangement to provide for higher speeds for the hydrostatic units.

General Comments on Hydrostatic Options

It is an additional idea of this invention to design the input transmission such that the hydrostatic branch can be added as an option to a powershift transmission with either the hydrostatic mode or the powershift mode being selectable by the operator as described above. It is an additional idea to use a modulated clutch which is already present in the powershift version to start the vehicle motion from standstill rather than the hydrostatic transmission whenever the transmission system is started in the hydromechanical mode at high startup loads. Thus the hydrostatic units can be kept small since the high startup torque is not required making it physically possible to provide selectable modes of operation as described in the paragraph above.

It is an additional idea to provide a full continuously variable transmission (FCVT) from maximum reverse through zero to maximum forward speed by using sufficiently large hydrostatic units without changes to the housings, planetary system and output transmission. This is possible because there exist synchronous speeds for the F clutch while operating in the pure hydrostatic mode at a point where the sun gear speed $S_1$ is equal to the ring gear speed.

Features in the Arrangement of Clutches, Gears, Shafts and Bearings

System for a Vehicle with Rear Mounted Transmission

FIG. 5 schematically represents a cross section of the transmission system for a vehicle design in which the transmission system is mounted to the rear frame with a relatively large space available at the input side of the transmission, thus the axial space available for the input transmission allows the use of pairs of clutches and the mounting of optional hydrostatic units at the input side of the transmission system. Further more this type of vehicle design requires the Power Take Off drive to be located across the top of the transmission with a pump drive to be located at the side of the transmission.

The input transmission has two identical clutch-gear assemblies for the forward and reverse shafts providing a cost advantage. No reverse idler gear is required, again a cost advantage. The clutches are arranged such that the high feedback speed on the 22f and 22rev gears does not affect the clutch actuation, thus no dump valves are required which are normally used to deal with high clutch speeds. The hydrostatic transmission is easily attachable to two shafts, requiring no extra gears, shafts or bearings.

The planetary system is arranged such that the input sun gear $S_1$ and the carrier C are floating, with the ring gear semifloating off one bearing support BF on the left side. This floatation provides good load distribution over all the planets. Only the output sun gear 32 is radially fixed on a bearing.

The output transmission is arranged such that the two high energy clutches (master clutches 1 and 2) with a large friction surface area and dual cooling flow are located on the output shaft where the torque is high. The low energy, low torque clutches 3 and 5 are located on one of the input shafts (C). The remaining clutch 4 uses the otherwise "dead" space on the output shaft below the bearing mounting of the $S_2$ shaft. The three clutches 1, 2 and 4, located on the output shaft, are designed such that the actuating piston is rotating with the clutch gear to eliminate the effect of the high speed of the output shaft in the higher gear selections. This clutch design is described in the provisional application Ser. No. 60/071661 entitled Clutch Assembly For Transmission on Jan. 16, 1998.

The input shaft ($S_2$ shaft) of the output transmission is mounted on two bearings. The gears 19(2) and 36(4) are cantilevered on the right side and the sun gear $S_2$ is cantilevered on the left side of the shaft ($S_2$ shaft). An extension of the one input shaft ($S_2$ shaft) acts as the bearing mount for the other input shaft (C shaft). This eliminates the need for a bearing mount attached to the housing, which would require additional axial space and cause an assembly problem. The 38a accessory drive gear is coupled to the input shaft to rotate at engine speed. It is in mesh with the 38i idler gear, which drives the PTOin shaft and which also is in mesh with the 29p pump gear (not shown on the Layout but indicated on FIG. 1H). The PTOin shaft drives a gear 33 located at the rear of the transmission assembly where it is in mesh with the PTO output gear 30 which in turn is connected to the PTOout shaft. Note, this arrangement makes it possible to bring the engine speed physically around the range transmission back to the center location of the assembly at the rear of the transmission in line with a PTO clutch and gear reduction (not shown).

The park brake is located on the output shaft below the pressure control manifold for the clutches 3 and 5. Again this axial space would otherwise not be utilized.

The mechanical front drive clutch (MFD) is located as far to the rear as possible to allow for maximum ground clearance at the center of the tractor.

System for a Vehicle with a Front Mounted Transmission

Figure 9:
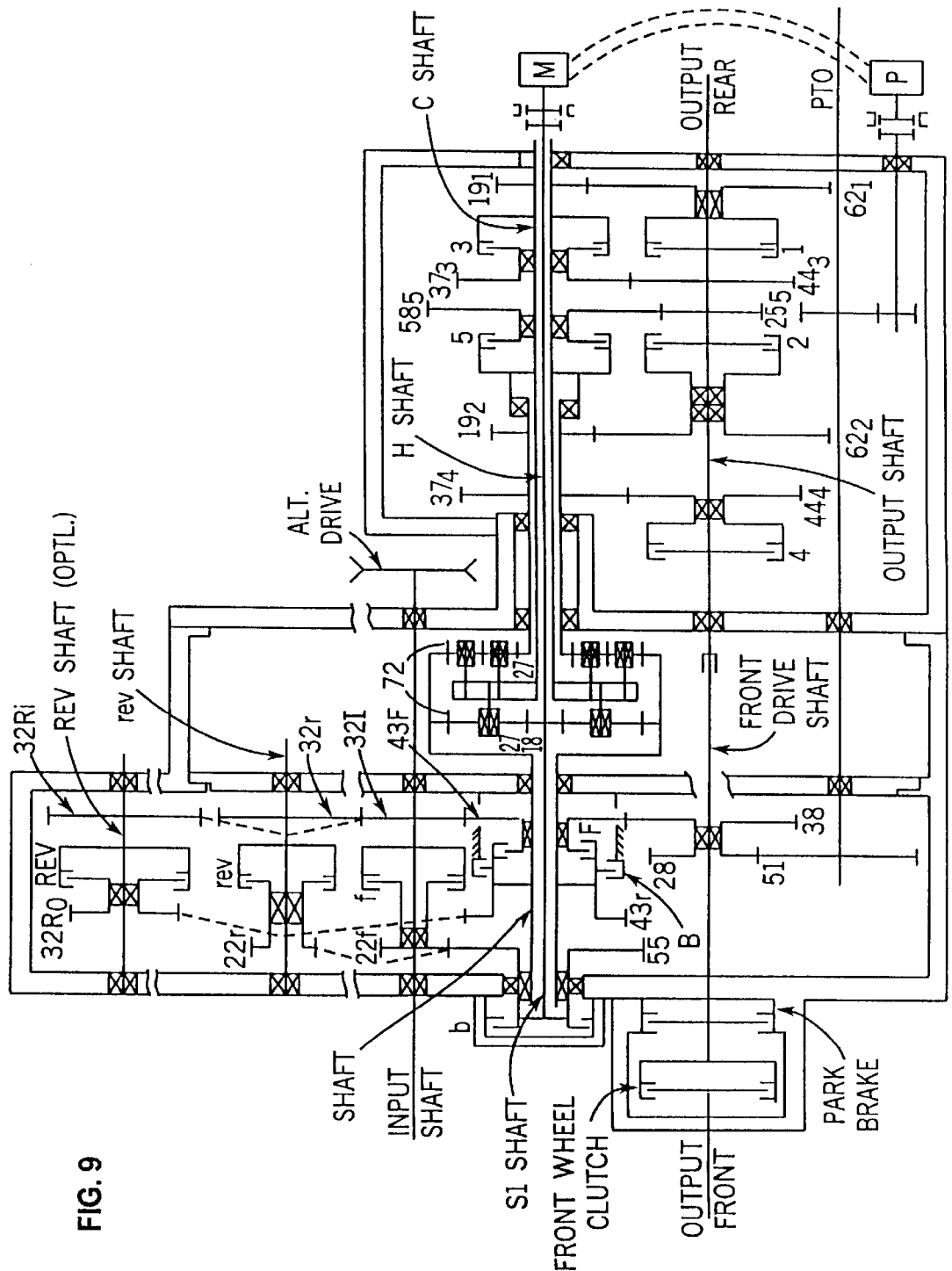
FIG. 9 is a schematic longitudinal sectional view similar to FIG. 1 but showing an alternative gear and clutch arrangement for a transmission system.
Figure 11:
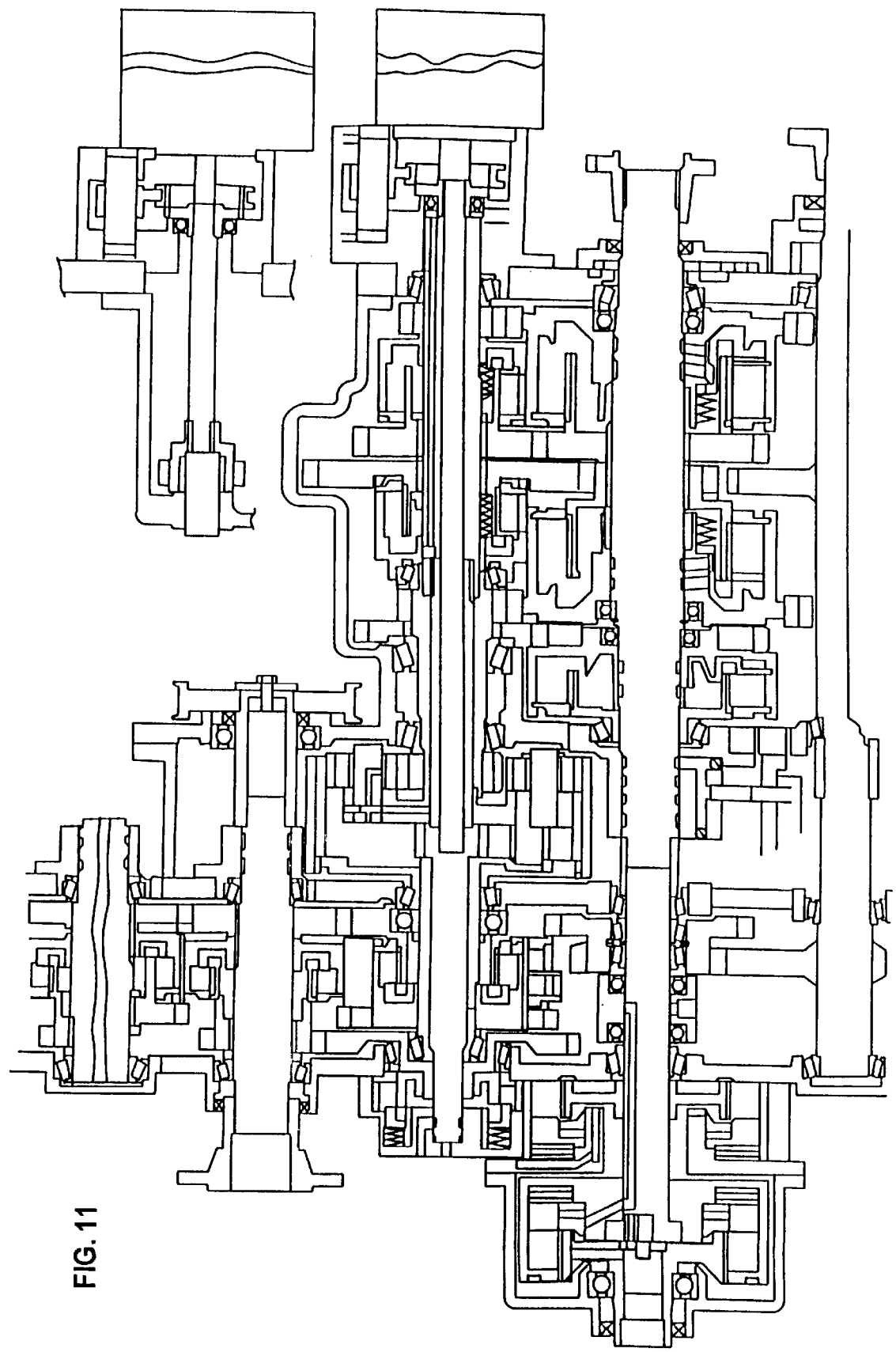
FIG. 11 is a longitudinal sectional view of the transmission schematically illustrated in FIG. 9.
Figure 12:
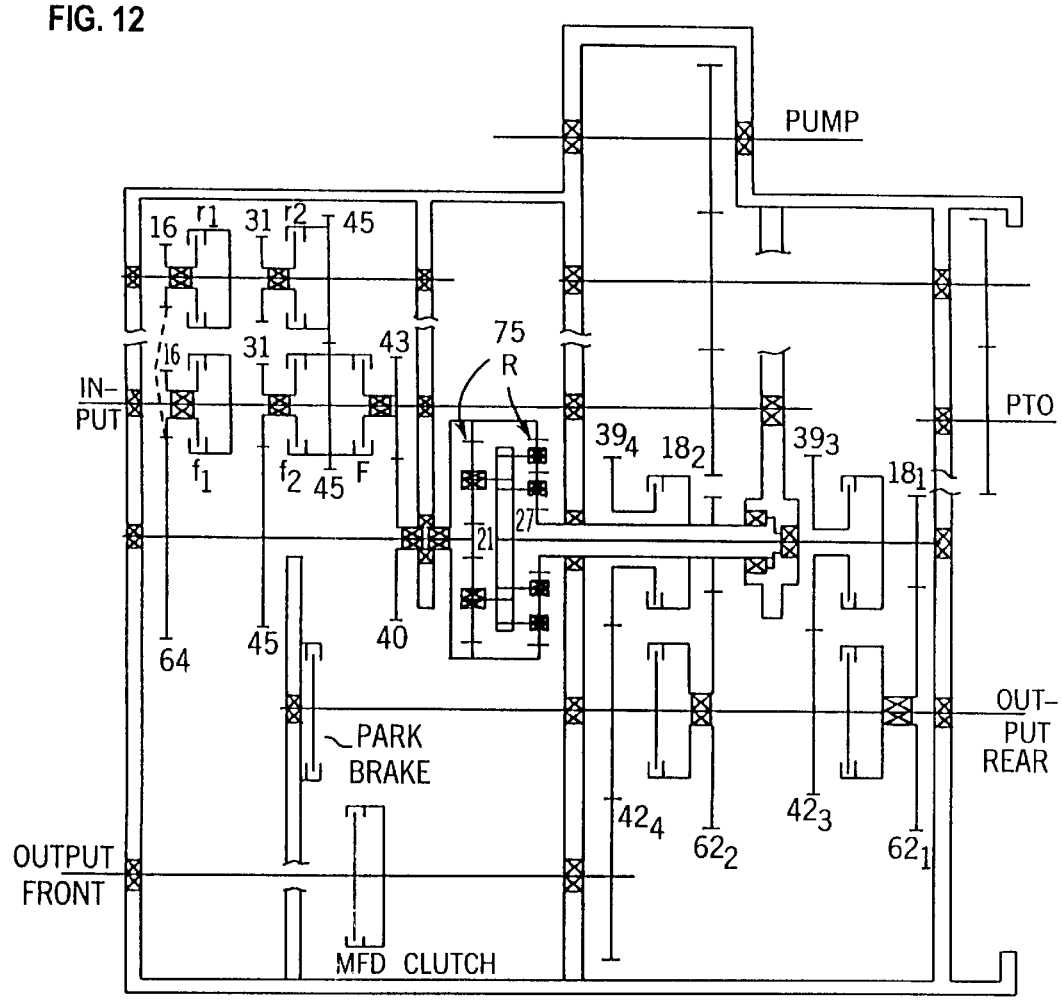
FIG. 12 is a schematic longitudinal sectional view similar to FIG. 1 but showing yet another alternative gear and clutch arrangement for a transmission system.
Figure 14:
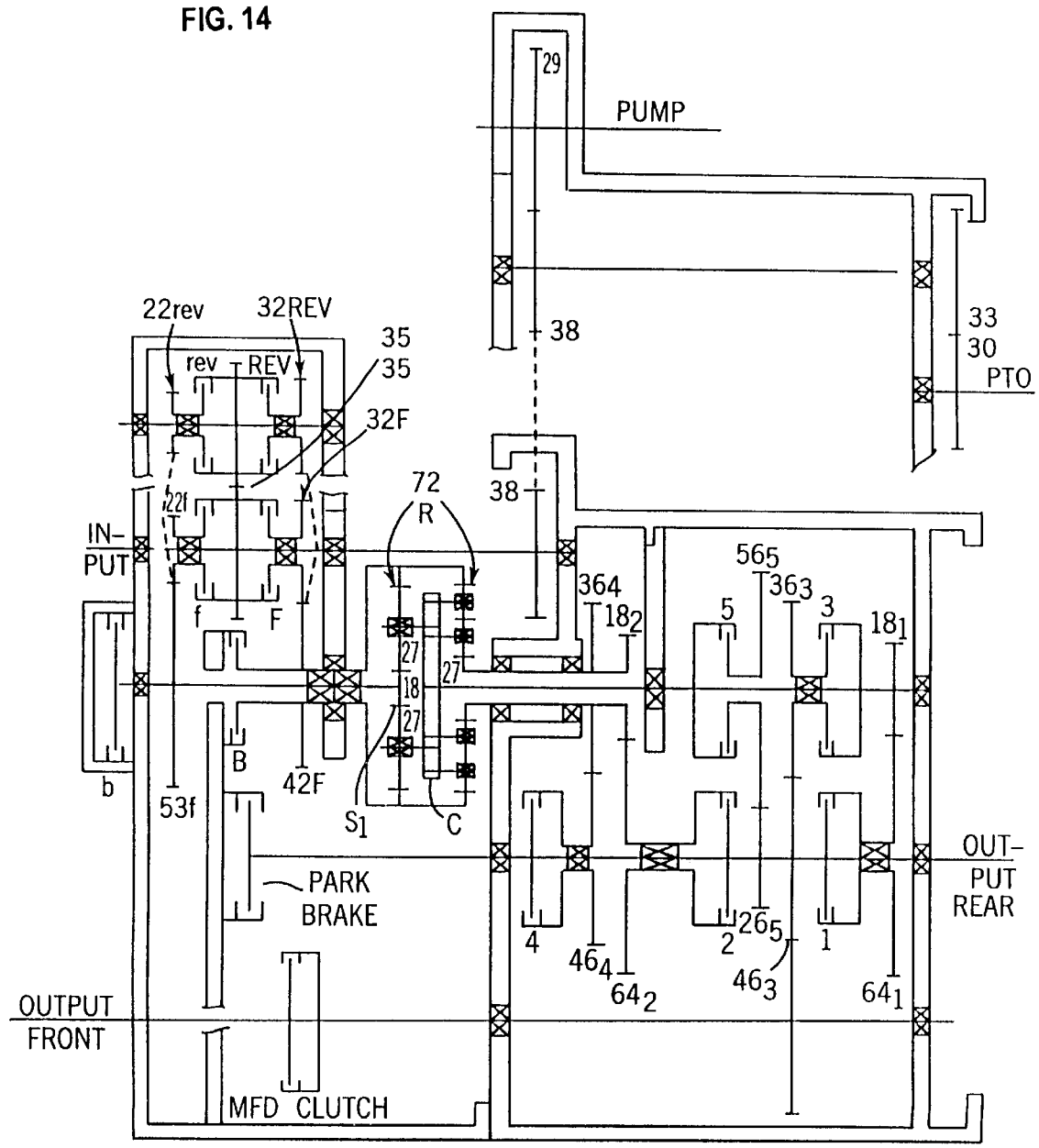
FIG. 14 is a schematic longitudinal sectional view similar to FIG. 1 but showing still another alternative gear and clutch arrangement for a transmission system.
Figure 16:
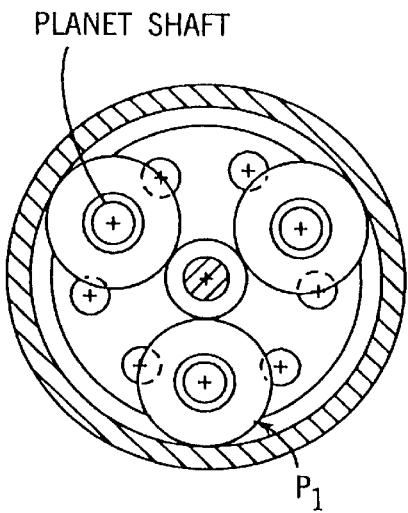
FIG. 16 is a left hand sectional view of one form of planetary gear system usable in combination with as transmission system according to the present invention.
Figure 17:
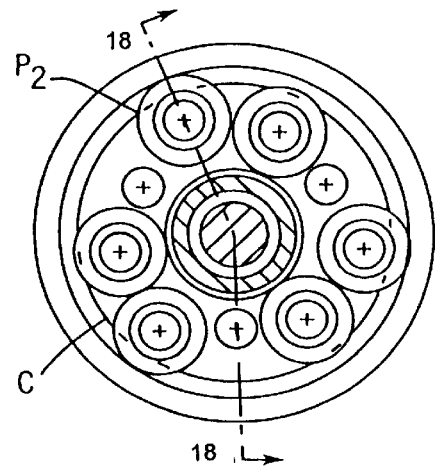
FIG. 17 is a sectional view of the planetary gear system illustrated in FIG. 16 and taken along line 17—17 of FIG. 18.
Figure 18:
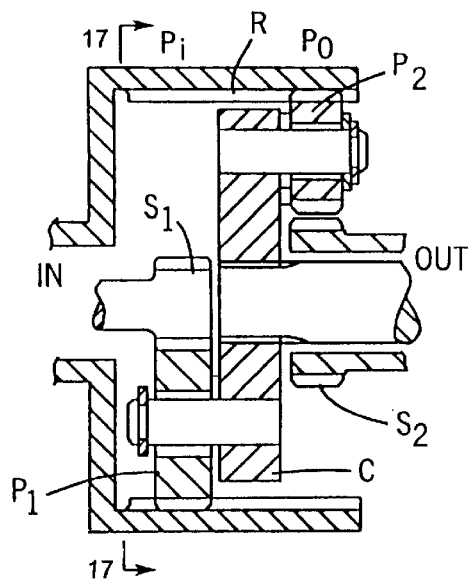
FIG. 18 is a sectional view taken along line 18—18 of FIG. 17.
Figure 20:
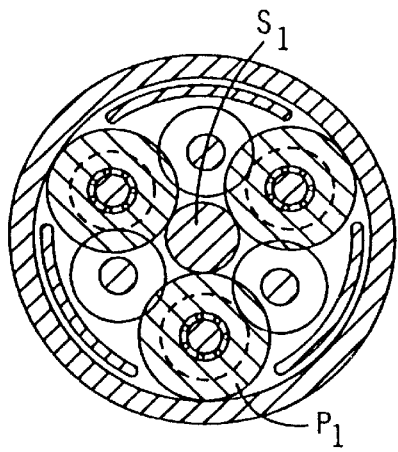
FIG. 20 is a sectional view taken along line 20—20 of FIG. 19.
Figure 21:
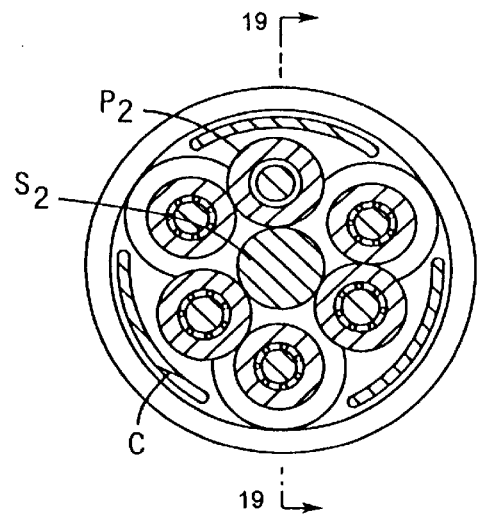
FIG. 21 is a sectional view taken along line 21—21 of FIG. 19.
Figure 19:
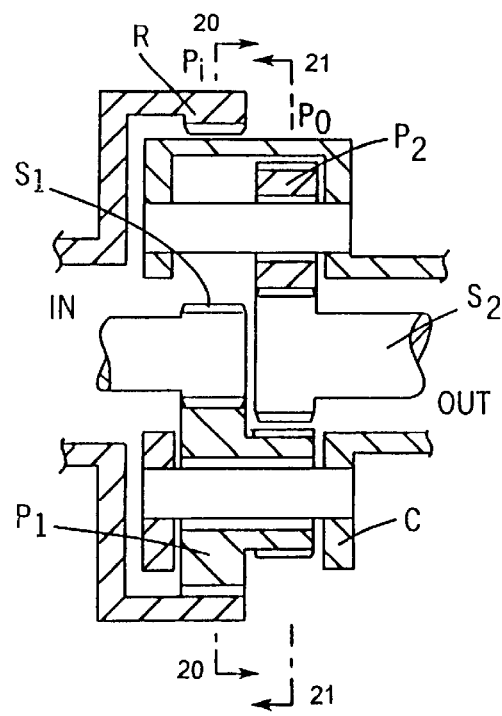
FIG. 19 is a longitudinal sectional view taken along line 19—19 of FIG. 21 and illustrating an alternative form of planetary gear system usable in combination with a transmission system according to the present invention.
Figure 23:
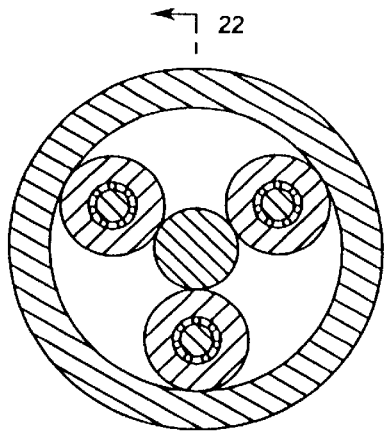
FIG. 23 is a sectional view taken along line 23—23 of FIG. 22.
Figure 24:
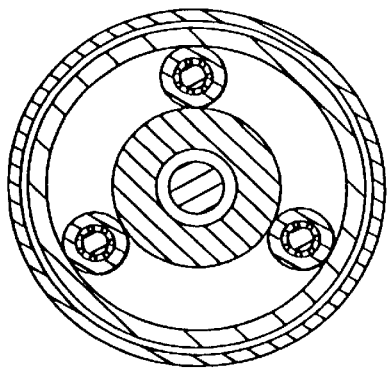
FIG. 24 is a sectional view taken along line 24—24 of FIG. 22.
Figure 22:
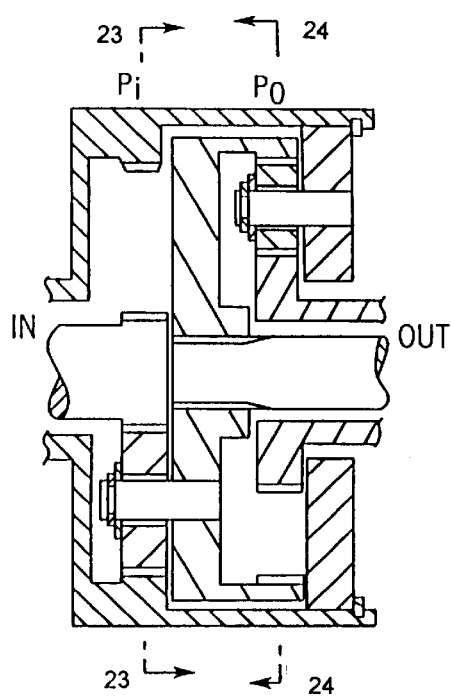
FIG. 22 is a longitudinal sectional view taken along line 22—22 of FIG. 23 and illustrating yet another alternative form of planetary gear system usable in combination with a transmission system according to the present invention.
Figure 25:
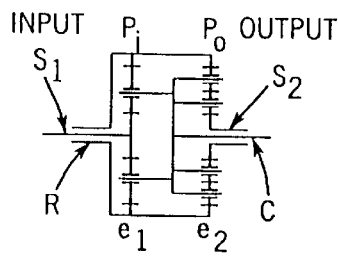
FIGS. 25 through 34 are schematic representations of a variety of planetary gear systems usable in combination with the transmission system according to the present invention.
Figure 26:
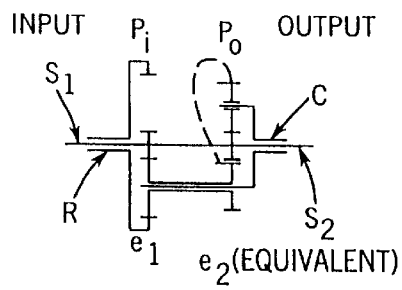
Figure 27:
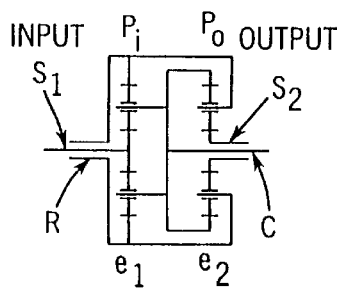

FIGS. 9, 10 and 11 schematically represents a transmission system for a vehicle design in which the transmission is mounted towards the engine side allowing relatively small axial space for the input transmission. In this design it is possible to arrange the gear system such that one single clutch per shaft is used for the two reverse clutches and one forward clutch. Also the optional hydrostatic units are moved towards the output side of the transmission. This design requires the Power Take Off to be located at the bottom of the transmission system, therefore, a geartrain from the input shaft to the bottom is required, which fits in perfectly with the arrangement of gears for the input transmission.

The input transmission is comprised of an input shaft on which the clutch f is mounted said clutch f selectively connecting the shaft $S_1$ to the input shaft through gears 22f and 55, is further comprised of one reverse shaft (rev shaft) on which the rev clutch is mounted said rev clutch selectively connecting the $S_1$ shaft to the input shaft through gears 32I to 32r to 22r to 55, is further comprised of one other reverse shaft on which the REV clutch is mounted, said REV clutch selectively connecting the R shaft to the input shaft through gears 32I to 32Ri to 32Ro to 43R, is further comprised of one hollow R shaft concentric to the $S_1$ shaft on which the F clutch is mounted said F clutch selectively connecting the input shaft to the R shaft through gears 32I to 43F, is further comprised of one b clutch which selectively stops the $S_1$ shaft from rotation and is further comprised of one B clutch which selectively stops the R shaft from rotation. The $S_1$ shaft is connected to the sungear of the planetary system and the R shaft is connected to the ring gear of the planetary system.

The transmission is further comprised of a Front Drive Shaft on which the Front Wheel drive Clutch, the Park Brake and the idler cluster gear 28–38 is mounted. The Front Wheel drive Clutch selectively connects the front wheels to the output shaft, the Park Brake selectively stops the output shaft from rotation and the idler cluster gear connects the input shaft to the PTO shaft through gears 32I to 43F to 38 to 28 to 51.

The compound planetary system and the output transmission are arranged in the same manner as described above under System for vehicle with rear mounted transmission.

The optional hydrostatic transmission is mounted at the rear of the transmission such that the fixed displacement unit M is selectively connectable to the H shaft which is located concentrically inside the C shaft and attached to the sungear 18, and such that the variable displacement unit P is selectively connectable to a shaft driven by a gear from the PTO shaft. The hydrostatic units M and P are hydraulically interconnected by fluid conduits.

FIGS. 10 and 11 schematically represents a realistic gear, shaft, bearing and housing arrangement for the front mounted transmission.

General Comments on Features in the Arrangement of Clutches, Gears, Shafts and Bearings From the above description associated with FIGS. 5 and 11, it is apparent that several ideas are unique, including but not limited to the following:

1. The arrangement of clutches, gears and shafts in the input transmission which makes it possible to use identical parts for the forward and reverse clutch assemblies, and also makes it possible to attach the hydrostatic units optionally, without the addition of gears, bearings and other major parts. (FIG. 5)
2. The arrangement of clutches gears and shafts in the input transmission which make it possible to minimize the axial space required for the input transmission and to provide for a Power Take Off. (FIG. 11)
3. The mounting of the planetary system, providing flotation of the sun gear $S_1$ and the carrier C in addition to providing stability through the radially fixed sun gear $S_2$ in combination with the semifloating-floating ring gear R, which is supported on one side by the bearing BF.
4. The mounting of the $S_2$ shaft on two bearings with cantilevered mounting of gears on each side in addition to provide a bearing mount for the C shaft through a cantilevered extension of the $S_2$ shaft.
5. The arrangement of gears, clutches and shafts in the output transmission providing for a maximum utilization of axial space for essentially a five speed package plus a park brake on two centers.
6. The arrangement of the pump drive and the PTO which utilizes the necessary idler gear 38i for two purposes: first to bring the pump drive gear 27p far enough out to provide clearance for the pump and second to provide a connection for the PTOin shaft. (Note that the direction of rotation of the PTOout shaft requires the idler gear.)

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of this invention.

What is claimed is:

1. A mechanical power transmission system connectable to an engine driven output of an apparatus, comprising:
    a housing;
    an input transmission arranged within said housing and including an input and two outputs, with said input being operably connected to the driven output of said apparatus;
    a compound planetary system including two inputs and two outputs, with said inputs being operably connected to the two outputs of said input transmission through mating gear sets; and
    an output transmission including two inputs connected to the two outputs of the compound planetary system and one output connected, through gearing, to a mechanism configured to be driven by said motor driven apparatus at various speeds.

2. The mechanical transmission system according to claim 1 wherein said input transmission absorbs engine power through said input shaft and divides the engine power selectively at various proportions for delivery to said two outputs, with said outputs of said input transmission delivering power at certain proportions to said two inputs of said compound planetary system, with the compound planetary system being configured to absorb, combine, and deliver power through either of the two compound planetary system outputs to said output transmission, and with said output transmission being configured to absorb power selectively at various gear ratios established through gearing and transmitting power to said one output at a variety of rotational speeds relative to the rotational speed of the engine output, and wherein the power flow at the outputs of said planetary system may be positive or negative.

3. The mechanical transmission system according to claim 1 wherein said input transmission is selectively conditionable to transmit the engine power selectively at various gear ratios to either the first output with the second output stopped, or transmit the engine power to the second output with the first output stopped, with either of said outputs delivering power to said compound planetary system, and with the mating gear sets of said compound planetary system absorbing power from said input transmission through either a first input or a second input and transmitting the power to either of said two outputs, with said two outputs of said compound planetary system being operably connected to deliver power to said output transmission, with said output transmission having selectively operable various power flow paths to for permitting said output of said output transmission to be operated at a variety of rotational speeds relative to the rotational speed of the engine output, and wherein the power flow at the output of said output transmission may be positive or negative.

4. The mechanical transmission system according to claim 1 wherein said compound planetary system is configured to absorb power through either of said two inputs connected to said input transmission and divide the power at certain ratios for delivery to said two outputs operably connected to the two inputs of the output transmission, and wherein said output transmission absorbs power at certain ratios transmitted thereto from said compound planetary system and combines the power for selective delivery at various gear ratios to a rotational output thereby providing said output of said output transmission with a variety of rotational speeds relative to the rotational speed of the engine output, and wherein the power flow of said rotational output of said output transmission may be positive or negative.

5. The transmission system of claim 1, in which the compound planetary system is comprised of first and second planet systems, each planet system having a ring gear, a sun gear and planet gears which are rotatably supported by shafts anchored in planet carriers, with the first planet system being a simple planetary, where each planet gear is in mesh with the sun gear and with the ring gear, and with the second planet system being a double planetary including a first set of planet gears in mesh with the sun gear and with a second set of planet gears in mesh with the ring gear, and wherein the ring gear of the first planet system is connected to the ring gear of the second planet system, and wherein the planet carrier of the first planet system is connected to the planet carrier of the second planet system, with the ring gear and the sun gear of the first planet system being the two inputs of the compound planetary system and the carrier and the sun gear of the second planet system being the two outputs of the compound planetary system.

6. The transmission system of claim 1, in which the compound planetary system is comprised of first and second planet systems, with the first planet system having a ring gear, and both planet systems having a sun gear and planet gears which are rotatably supported by shafts anchored in a planet carrier, with the first planet system being a simple planetary, where each planet gear is in mesh with the sun gear and the ring gear, and with the second planet system being a double planetary, where a first set of planets is in mesh with the sun gear and a second set of planets, the second set of planets of the second planet system being connected to the planet gears of the first planet system in pairs and rotatably mounted on the same shafts which are anchored in the common carrier, with the ring gear and the sun gear of the first planet system being the two inputs of the compound planetary system, and with the carrier and the sun gear of the second planet system being the two outputs of the compound planetary system.

7. The transmission system of claim 1, in which the compound planetary system is comprised of first and second planet systems, each planet system having a ring gear, a sun gear and planet gears which are rotatably supported by shafts anchored in planet carriers, with the first and second planet system being simple planetaries, where each planet gear is in mesh with the sun gear and with the ring gear, respectively, where the ring gear of the first planet system is connected to the planet carrier of the second planet system, and with the planet carrier of the first planet system being connected to the ring gear of the second planet system, and wherein the ring gear and the sun gear of the first planet system comprise the two inputs of the compound planetary system and the ring gear and the sun gear of the second planet system comprise the two outputs of the compound planetary system.

8. The transmission system of claim 1, in which the compound planetary system is comprised of first and second planet systems, with each planet system having a ring gear, a sun gear and planet gears which are rotatably supported by shafts anchored in planet carriers, and wherein said first and second planet systems are each configured as double planetary systems where a first set of planets is in mesh with the sun gear and a second set of planets is in mesh with the ring gear, where the ring gear of the first planet system is connected to the ring gear of the second planet system and where the planet carrier of the first planet system is connected to the sun gear of the second planet system, with the ring gear and the sun gear of the first planet system being the two inputs of the compound planetary system and the carrier and the sun gear of the second planet system being the two outputs of the compound planetary system.

9. The transmission system of claim 1, in which the compound planetary system is comprised of first and second planet systems, with each planet system having a ring gear, a sun gear and planet gears which are rotatably supported by shafts anchored in planet carriers, and wherein the first and second planet systems are configured as simple planetaries, where each planet gear is in mesh with the sun gear and with the ring gear, respectively, and wherein the ring gear of the first planet system is connected to the ring gear of the second planet system and the sun gear of the first planet system is connected to the sun gear of the second planet system, and wherein the ring gear and the sun gear of the first planet system comprise the two inputs of the compound planetary system and the ring gear and the sun gear of the second planet system comprise the two outputs of the compound planetary system.

10. The transmission system of claim 1, in which the compound planetary system is comprised of first and second planet systems, with each planet system having a ring gear, a sun gear and planet gears which are rotatably supported by shafts anchored in planet carriers, with the first planet system being a simple planetary, where each planet gear is in mesh with the sun gear and with the ring gear, and with the second planet system being a double planetary, where a first set of planets is in mesh with the sun gear and a second set of planets is in mesh with the ring gear, where the ring gear of the first planet system is connected to the planet carrier of the second planet system, and where the planet carrier of the first planet system is connected to the sun gear of the second planet system, with the ring gear and the sun gear of the first planet system comprising the two inputs of the compound planetary system and the ring gear and the sun gear of the second planet system comprising the two outputs of the compound planetary system.

11. The transmission system of claim 1, in which the compound planetary system is comprised of first and second planet systems, with each planet system having a ring gear, a sun gear and planet gears which are rotatably supported by shafts anchored in planet carriers, and wherein the first planet system is a simple planetary, where each planet gear is in mesh with the sun gear and with the ring gear, and wherein the second planet system is a double planetary, where one set of planets is in mesh with the sun gear and the other set of planets is in mesh with the ring gear, and wherein the ring gear of the first planet system is connected to the sun gear of the second planet system, and where the planet carrier of the first planet system is connected to the ring gear of the second planet system, and where the planet carrier and the sun gear of the first planet system comprise the two inputs of the compound planetary system and the carrier and the sun gear of the second planet system comprise the two outputs of the compound planetary system.

12. The transmission system of claim 1, in which the compound planetary system is comprised of first and second planet systems, with each planet system having a ring gear, a sun gear and planet gears which are rotatably supported by shafts anchored in planet carriers, with the first and second planet system being configured as simple planetaries, where each planet gear is in mesh with the sun gear and with the ring gear, respectively, and wherein the planet carrier of the first planet system is connected to the ring gear of the second planet system, and wherein the sun gear of the first planet system is connected to the sun gear of the second planet system, and wherein the planet carrier and the sun gear of the first planet system comprise the two inputs of the compound planetary system and the planet carrier of the second planet system and the ring gear of the second plant system comprise the two outputs of the compound planetary system.

13. The transmission system of claim 1, in which the compound planetary system is comprised of first and second planet systems, with each planet system having a ring gear, a sun gear and planet gears which are rotatably supported by shafts anchored in planet carriers, and wherein the first and second planet systems are configured as simple planetaries, where each planet gear is in mesh with the sun gear and with the ring gear respectively, and where the sun gear of the first planet system is connected to the sun gear of the second planet system, and where the planet carrier of the first planet system is connected to the planet carrier of the second planet system, and wherein the ring gear and the sun gear of the first planet system comprise the two inputs of the compound planetary system and the ring gear and the planet carrier of the second planet system comprise the two outputs of the compound planetary system.

14. The transmission system of claim 1, in which the compound planetary system is comprised of first and second planet systems, with each planet system having a ring gear, a sun gear and planet gears which are rotatably supported by shafts anchored in planet carriers, and wherein the first planet system is a simple planetary, where each planet gear is in mesh with the sun gear and with the ring gear, and wherein the second planet system is a double planetary where a first set of planets is in mesh with the sun gear and with a second set of planets is in mesh with the ring gear, where the carrier of the first planet system is connected to the carrier of the second planet system, and where the sun gear of the first planet system is connected to the ring gear of the second planet system, and wherein the ring gear and the sun gear of the first planet system comprise the two inputs of the compound planetary system and the carrier and the sun gear of the second planet system comprise the two outputs of the compound planetary system.

15. The transmission system of claim 1, in which the input transmission includes first, second and third clutches, with said first clutch being selectively engagable to connect the first input of the compound planetary system to one input of said input transmission to establish a forward speed ratio, and with said third clutch being selectively engagable to connect the first input of the planetary system to the input of the input transmission to establish a reverse speed ratio, with said forward speed ratio being essentially equal to said reverse speed ratio, and wherein said second clutch is selectively engagable to connect said first input of the compound planetary system to the housing thereby stopping rotation of said first input member to the compound planetary system, and wherein said input transmission further comprises an odd number $N_s$ of clutches selectively engagable to connect the second input member of the compound planetary system to the input of said input transmission at a number $(N_s-1)/2$ of speed ratios in forward and at the same number $(N_s-1)/2$ of speeds in reverse at essentially equal ratios as the forward speeds, said input transmission further including another selectively engagable clutch to releasably connect the second input of the compound planetary system to the housing thereby stopping rotation of said second input of the compound planetary system, and wherein said second input of the compound planetary system is that input whose speed is varied to effect a change in output speed of the transmission system within a normal operating range, said normal operating range being that range of selectable speeds in which said first input of the compound planetary system remains at constant speed with respect to speed of the engine whenever a sequential shift is made.

16. The transmission system of claim 1, in which the input transmission includes a forward clutch, with said forward clutch being selectively engagable to operably connect one input of the compound planetary system to the input of said input transmission at a predetermined forward speed ratio, with said input transmission further including an even number $N_s$ of clutches selectively engagable to connect the second input of the compound planetary system to the input of said input transmission at a number $(N_s)/2$ of speed ratios in a forward direction, and wherein said second input of the compound planetary system is that input whose speed is varied to effect a change in output speed of the transmission system within a normal operating range, said normal operating range being that range of selectable speeds in which said one input of the compound planetary system remains at constant speed with respect to the speed of the engine whenever a sequential shift is made.

17. The transmission system of claim 16 wherein said input transmission further includes a selectively engagable stopping clutch which, when engaged, operably connects said one input of the compound planetary system to the housing thereby stopping rotation of said one input member of the compound planetary system.

18. The transmission system of claim 16 wherein said input transmission further includes a selectively engagable reverse clutch which, when engaged, operably connects said one input of the compound planetary system to the input of the input transmission to establish a reverse speed ratio which is substantially equivalent to said forward speed ratio established when said forward clutch is selectively engaged, with said input transmission further including an even number of clutches selectively engagable to connect a second input of the compound planetary system to the input of said input transmission at a number $(N_8)/2$ of speed ratios in a reverse direction and at essentially equal ratios in the forward speeds.

19. The transmission system of claim 1, in which the output transmission is comprised of first and second sets of clutches selectively engagable to operate the output of said output transmission at predetermined ratios relative to the outputs of the compound planetary system, with said first set of output transmission clutches operably connecting said output of said output transmission to a first output of the compound planetary system at various gear ratios, and wherein the second set of output transmission clutches operably connecting said output of said output transmission to the second output of the compound planetary system at various gear ratios, said first output of the compound planetary system being that member which increases in speed as a second input of the compound planetary system increases in speed while the first input of the compound planetary system remains at constant speed, and said second output of the compound planetary system being that member which decreases in speed as said second input of the compound planetary system increases in speed while said first input of the compound planetary system remains at a relatively constant speed.

20. The transmission system of claim 19 wherein each set of clutches in the output transmission is provided with a predetermined number of clutches, and wherein the number of predetermined clutches in one set of said sets of clutches is one fewer than in the other set of said sets of clutches.

21. The transmission system of claim 3, in which all gear ratios of the mating gear sets within the compound planetary system are such that a change in speed of one output of the compound planetary system with respect to the speed of the second input of the compound planetary system multiplied by $r_2$ is essentially equal to a change in speed of the second output of the compound planetary system with respect to the speed of the second input of the compound planetary system multiplied by $-r_1$, with the first input of the compound planetary system at constant speed as expressed in the following differential equation $$r_2 \frac{ds_1}{ds_1} = -Kr_1 \frac{de}{ds_1},$$

R=constant, and are such that the speed of the second output of the compound planetary system multiplied by $r_2$ is essentially equal to the speed of the first output of the compound planetary system multiplied by $r_1$ multiplied by K, with the second input at zero speed and the first input of the compound planetary system at constant speed, as expressed in the following equation:

where $S_2 r_2 = KCr_1$ at $S_1 = 0$, $S_2$ is the speed of the second output of the compound planetary system which decreases in speed as the second input of the compound planetary system increases in speed while the first input of the compound planetary system is at constant speed, $r_2$ is the lowest selectable gear ratio between the sun gear and the output of the output transmission, C is the speed of the first output of the compound planetary system which increases in speed as the second input of the compound planetary system increases in speed while the first input of the compound planetary system remains at constant speed, $r_1$ is the lowest selectable gear ratio between the carrier of the compound planetary system and the output of the output transmission, $S_1$ is the speed of the second input of the compound planetary system, which is selectively connectable to the output of said engine at one or more ratios in forward and reverse, with said second input of the compound planetary system being that input whose speed is varied to effect a change in output speed of the transmission system within a normal operating range, said normal operating range being that range of selectable speeds in which the said first input of the compound planetary system remains at constant speed with respect to the engine, R is the speed of the first input of the compound planetary system, which remains selectively connected to the engine at a certain gear ratio either in forward or in reverse, whenever the transmission is operating in the normal operating range either in forward or reverse respectively, and where K is a constant calculated by the following equation:

$$K = \left(\frac{H}{L}\right) \exp\left(\frac{1}{N_0 - 2 + \frac{2Ns}{Ns+1}}\right),$$

where

H is the highest desired rated output speed of the transmission system,

L is the lowest desired rated output speed to be attained in the normal operating range said normal operating range being the range of selectable speeds in which the first input of the compound planetary system remains connected through a gear ratio to the engine, $N_0$ is the number clutches in the output transmission, $N_s$ is the number of clutches in the gear set which selectively connects the engine through gear ratios to second input of the compound planetary system or stops said second input of said compound planetary system from rotation.

22. The transmission system of claim 19, wherein said input transmission has an odd number of selectable connections between the input of said input transmission and the second input of the compound planetary system, with each selectable connection establishing a gear ratio, and wherein the gear ratio of each selectable connection, including the one where the second input of the compound planetary system is stopped, is such that geometric steps in the output speed of the transmission system from one gear selection to the next in a certain interval are essentially equal, said interval being defined as the range from a gear selection in which two clutches in the output transmission are engaged, to that higher gear selection in which the second input of the compound planetary system is stopped, with a geometric step being defined as the factor with which an output speed of one gear selection is multiplied to obtain the speed of the next higher gear selection, and with said second input being that input of the compound planetary system whose speed is varied in order to effect a change in output speed of the transmission system within a normal operating range, said normal operating range being that range of selectable gears in which the first input of the compound planetary system remains at constant speed with respect to the engine driven output.

23. The transmission system of claim 19, wherein said input transmission has an even number of selectable connections between the input of said input transmission and the second input of the compound planetary system, with each selectable connection establishing a gear ratio, and wherein the gear ratio of each selectable connection is such that geometric steps in the output speed of the transmission system from one gear selection to the next in a certain interval are essentially equal, said interval being defined as the range from a gear selection in which two clutches in the output transmission are engaged, to that higher gear selection in which the direction of the speed of the second input of the compound planetary system is changed, with a geometric step being defined as the factor with which an output speed of one gear selection is multiplied to obtain the speed of the next higher gear selection, and with said second input being that input member of the compound planetary system whose speed is varied in order to effect a change in output speed of the transmission system within a normal operating range, said normal operating range being that range of selectable gears in which the first input of the compound planetary system remains at a substantially constant speed with respect to the engine driven output either in forward or reverse.

24. The transmission of system of claim 21 wherein each selectively operable flow path of said output transmission is conditionable between a low speed gear ratio and a high speed gear ratio, and wherein adjacent speed gear ratios in each flow path are differentiated by a factor equal to $K^2$.

25. The transmission system of claim 24 wherein the lowest speed ratio in one selectively operable flow path of said output transmission is generally equal to the lowest speed ratio in another selectively operable flow path of said output transmission.

26. The transmission system of claim 22 within said normal operating range, in which the speed selection that connects the two outputs of the compound planetary system at two respective ratios (c and s) to the output of the output transmission, provides a speed between the speed of the output of the output transmission when the second input of the compound planetary is connected to the input of the input transmission at a certain ratio (f) and one of said inputs of the compound planetary system is connected at the same ratio (c) to the output of the output transmission and (in between) the speed of the output of the output transmission when the second input of the compound planetary system is connected to the input of the input transmission at the same ratio (f) and said second output of the compound planetary system is connected at the same ratio (s) to the output of the output transmission.

27. The transmission system of 22 wherein sequentially higher speeds for the output of the output transmission are obtainable within the normal operating range where the first put of the compound planetary system is connected to the input of the input transmission through four selectively engagable clutches, with a lowest speed ratio being established for said transmission system when only one of said four clutches is engaged, and with one additional clutch of said four clutches being engaged in order to obtain the next higher speed for the output of the output transmission.

28. Transmission system of claim 27 wherein speed selections are obtainable through various gear ratios for the output of the output transmission within a specified range and outside the normal operating range, said specified range being selectively obtainable when one input to the compound planetary system is connected to the input of the input transmission through a series of selectively engaged clutches including first and second output clutches and an input clutch, with one gear ratio being obtainable by simultaneous engagement of two output clutches in combination with the input clutch which connects the second input of the compound planetary system to the input of the input transmission, and wherein an additional gear ratio being obtainable when said two output clutches are selectively engaged to connect the output of the compound planetary system to the output of the output transmission, and wherein still another gear ratio is obtainable when one output clutch is selectively operated to connect the other output of the compound planetary system to the output of the output transmission.

29. The transmission system of claim 22 wherein speed selections are selectively obtainable outside the normal operating range where the first input to the compound planetary system is connected to the input of the input transmission by the engagement of any one output clutch in the output transmission in combination with any one input clutch which connects the second input of the compound planetary system to the input of the input transmission and wherein the first input to the compound planetary system is stopped by the engagement of a clutch.

30. A transmission system operably connected to a rotatable output of an engine said transmission system comprising:
    a housing;
    an input transmission arranged within said housing and having an input, two outputs and selectively operable gearing disposed between said input and said outputs to define a first selectively connectable power flow path from the engine to either first or second inputs of a compound planetary system, and wherein said input transmission is comprised of a second selectively connectable power flow path from the engine to the second input of the compound planetary system, with said second selectively connectable power flow path being continuously variable, and wherein said compound planetary system is configured with mating gear sets to absorb, combine and deliver power through either of two outputs to an output transmission, with said output transmission having first and second inputs connected to the two outputs of the compound planetary system to absorb power selectively at various gear ratios and gearing for transmitting power to an output at various rotational speeds relative to the rotational speed of the engine output, and wherein the power flows at the outputs of the planetary system may be positive or negative.

31. The transmission system of claim 30 wherein said continuously variable power flow path comprises a hydrostatic system including a variable displacement hydrostatic unit selectively connectable to the engine output and a fixed displacement hydrostatic unit selectively connectable to the second input of the compound planetary system, with said hydrostatic units being connected by hydraulic conduits.

32. The transmission system of claim 31 wherein said continuously variable power flow path provides a speed range for the second input of the compound planetary system between forward and reverse such that at as an output of said hydrostatic system approaches extreme speeds, in forward or reverse directions, a shift from a first clutch to a second clutch in the output transmission is effected at or near synchronism of the engaging clutch, with synchronism being defined as the condition where an input member of the clutch is operated at approximately equivalent speed as an output member of the same clutch.

33. The transmission system of claim 32 in which the second continuously variable power flow path is configured to allow full available engine power to be transmitted in a normal hydromechanical range but lacks the capacity to transmit full tractive load in a pure hydrostatic range when two lowest speed output clutches in the output transmission are selectively engaged for operation, said normal hydromechanical range being that portion of a selected range where part of the power flows through the hydrostatic system and part of the power flows through the mechanical connection, and wherein said pure hydrostatic range being that portion of the selected range where all the power flows through the hydrostatic system.

34. The transmission system of claim 33 wherein said housing is mountable on a vehicle, and wherein at least one of said lowest speed output clutches in said output transmission is configured sufficiently large to bring the vehicle from standstill to full motion under full tractive load by gradually engaging said sufficiently large output clutch.

35. The transmission system of claim 33 wherein said hydrostatic system within said input transmission has sufficient capacity to bring the vehicle from standstill to full motion under full tractive load by gradually increasing the displacement of the variable hydrostatic unit from zero to maximum forward or reverse in selected gearing where the two lowest speed clutches in the output transmission are engaged, thus allowing engagement of the forward or reverse clutch at synchronism to provide full continuous variability at full load from maximum reverse speed through zero speed to maximum forward speed.

36. The transmission system of claim 30, wherein said input transmission includes a plurality of clutches selectively engagable to connect the input of the compound planetary system to either the engine output or to the housing, said plurality of clutches including a forward ratio clutch, a reverse ratio clutch, and a clutch for releasably maintaining said input from operably moving.

37. The transmission system of claim 30, wherein said input transmission further includes a countershaft along with selectively operable and operationally equivalent forward and reverse pairs of clutches, which said pairs may be physically equal to each other, and wherein said forward pair of clutches are mounted on said input shaft with two forward clutch gears, and wherein said reverse pair of clutches are mounted on the countershaft with two reverse clutch gears, the countershaft being carried within and by the housing, with said selectively operable gearing connecting the input of said input transmission and said countershaft such that one gear connected to a first output of said input transmission outputs is in mesh with one of said forward clutch gears and one of said reverse clutch gears, and wherein another gear connected to a second output of said input transmission is in mesh with another of said forward clutch gears and the other of said reverse clutch gears, and wherein each output of said input transmission is selectively connectable to the housing through two clutches respectively.

38. The transmission system of claim 37 wherein said countershaft extends beyond said housing to provide a selectable connection to said variable displacement hydrostatic unit, and wherein the input of the compound planetary system extends beyond said housing to provide a selectable connection to said fixed displacement hydrostatic unit.

39. The transmission system of claim 30 wherein said input transmission includes a selectively operable first forward single pack clutch arranged on said input to the input transmission for selectively connecting the second input of the compound planetary system to the input of the input transmission a selectively operable second forward single pack clutch pack arranged on said input to the input transmission for selectively connecting the first input of the compound planetary system to said input of said input transmission, and wherein said input transmission further includes first and second reverse clutches located on first and second countershafts carried by said housing, and wherein said gearing of said input transmission includes a first gear mounted to said input shaft and in meshing relationship relative to a second gear, with said first and second gears being mounted on said first and second countershafts, respectively, in addition to being in mesh with a clutch gear of said second forward single pack clutch, and wherein said clutch gear acting as an idler gear for a Power Take Off gear train, and wherein an output gear of said first reverse clutch and an output gear of the said first forward single pack clutch being in mesh with a gear connected to one input of said compound planetary system, said one input of said compound planetary system also being operably connected to an output of a holding clutch selectively operable to inhibit operation of said one input of the compound planetary system, and wherein an output gear of said second reverse clutch is in mesh with a gear mounted on said second input of the compound planetary system, with said second single pack forward clutch having a clutch carrier mounted to said one input of said compound planetary system, with said carrier of said compound planetary system carrying an additional clutch arranged concentric to said second single pack forward clutch F, said additional clutch B selectively connecting said one input of the compound planetary system to the housing thereby stopping operation of the one input to the compound planetary system.

40. The transmission system of claim 39 wherein the second input of the compound planetary system is selectively connectable to said hydrostatic unit through a hollow elongated shaft extending from the second input to the compound planetary system, said hollow shaft serving as one output of the compound planetary system.

41. The transmission system of claim 5 wherein each ring gear of the first and second planet systems of the compound planetary system is mounted through a splined carrier to a hollow shaft on a first side, said hollow shaft being mounted through a bearing in the housing thereby allowing a second side to float on the meshing ring gear and planets, with said planets being allowed to float on the meshing interrelationship between the planets and the sun gear, and wherein the output sun gear of the second planet system being mounted on a shaft carried by bearings, and wherein the input sun gear of the first planet system is allowed to float thus insuring equal distribution of tooth load among the planet gears.

42. The transmission of claim 19 in which a shaft is attached to the one of the two outputs of the compound planetary system, and wherein said shaft is mounted in the housing through two axially spaced bearings for carrying the gear load of either one of two gears plus the load of a bearing, said loads being cantilevered off an output side of said shaft, while the sungear of the second planet system is cantilevered off an input side of said shaft.

43. A transmission system operably connected to a rotatable output of an engine, said transmission system comprising:
   a housing;
   an input transmission arranged within said housing and having an input, two outputs and selectively operable gearing disposed between said input and said outputs to define a first selectively connectable power flow path from the engine to either first or second inputs of a compound planetary system, and wherein said input transmission includes a hydrostatic system including a variable hydrostatic unit defining, at least partially, a second selectively connectable power flow path from the engine to the second input of the compound planetary system, with said second selectively connectable power flow path being continuously variable, and wherein said compound planetary system is configured with mating gear sets to absorb, combine and deliver power through either of two outputs to an output transmission, with said output transmission having first and second inputs connected to the two outputs of the compound planetary system to absorb power selectively at various gear ratios and gearing for transmitting power to an output at various rotational speeds relative to the rotational speed of the engine output, and wherein continuously variable power flow path provides a speed range for the second input of the compound planetary system between forward and reverse such that as an output of said hydrostatic system approaches extreme speeds, in forward or reverse directions, a shift from a first clutch to a second clutch in the output transmission is effected at or near synchronism of the engaging clutch, with synchronism being defined as the condition where an input member of the clutch is operated at approximately equivalent speed as an output member of the same clutch.

44. The transmission system according to claim 43 wherein said housing is mounted on vehicle.

45. The transmission system of claim 44 wherein said hydrostatic system within said input transmission has sufficient capacity to bring the vehicle from standstill to full motion under full tractive load by gradually increasing the displacement of the variable hydrostatic unit from zero to maximum forward or reverse in selected gearing where two lowest speed clutches in the output transmission are engaged, thus allowing engagement of a forward or a reverse clutch at synchronism to provide full continuous variability at full load from maximum reverse speed through zero speed to maximum forward speed.

46. The transmission system according to claim 43 wherein said input transmission has selectable connections between the inputs to said input transmission and the outputs of said input transmission for permitting said transmission system to operate within a normal operating range, said normal operating range including a range of selectable connections between the inputs to the compound planetary system and the outputs of the input transmission.

47. The transmission system of claim 46 wherein speed selections for the output of the output transmission are selectively obtainable outside of the normal operating range by simultaneous engagement of first and second output clutches arranged within said output transmission in combination with conditioning of the variable hydrostatic unit to connect the second output of the compound planetary system to the input of the input transmission, wherein said first output clutch connects the second output of the compound planetary system to the output of the output transmission, and wherein said second output clutch connects the first output member of the compound planetary system to the output of the output transmission at respective ratios.

48. The transmission system of claim 46 wherein speed selections for the output of the output transmission are selectively obtainable outside of the normal operating range by selective engagement of an output clutch in the output transmission in combination with the variable hydrostatic unit which connects the second output of the compound planetary system to the input of the input transmission and in combination with the first input to the compound planetary system being maintained substantially stationary by a clutch.

49. A transmission system of claim 43, in which gear ratios of the mating gear sets within the compound planetary system are such that the rate of change in speed of one output of the compound planetary system with respect to the speed of the second input of the compound planetary system is essentially equal to the rate of change in speed of the second output of the compound planetary system with respect to the speed of the second input of the compound planetary system multiplied by the number minus $(r_1/r_2)$ multiplied by K, with the first input of the compound planetary system at constant speed as expressed in the following differential equation $$r_2 \frac{ds_1}{ds_1} = -Kr_1 \frac{de}{ds_1},$$

R=constant, and are such that the speed of the second output of the compound planetary system multiplied by $r_2$ is essentially equal to the speed of the first output of the compound planetary system multiplied by $r_1$ multiplied by K, with the second input at zero speed and the first input of the compound planetary system at constant speed, as expressed in the following equation:

$$S_2 r_2 = KCr_1 \text{ at } S_1 = 0,$$

where $S_2$ is the speed of the second output of the compound planetary system which decreases in speed as the second input of the compound planetary system increases in speed while the first input of the compound planetary system is at constant speed, $r_2$ is the lowest selectable gear ratio between the sun gear and the output of the output transmission, C is the speed of the first output of the compound planetary system which increases in speed as the second input of the compound planetary system increases in speed while the first input of the compound planetary system remains at constant speed, $r_1$ is the lowest selectable gear ratio between the carrier of the compound planetary system and the output of the output transmission, $S_1$ is the speed of the second input of the compound planetary system, which is selectively connectable to the output of said engine at one or more ratios in forward and reverse, with said second input being that input member of the compound planetary system being that input whose speed is varied to effect a change in output speed of the transmission system within a normal operating range, said normal operating range being that range of selectable speeds in which the said first input of the compound planetary system remains at constant speed with respect to the engine, R is the speed of the first input of the compound planetary system, which remains selectively connected to the engine at a certain gear ratio either in forward or in reverse, whenever the transmission is operating in the normal operating range either in forward or reverse respectively, and where K is a constant calculated by the following equation:

$$K = \left(\frac{H}{L}\right) \exp\left(\frac{1}{N_0 - 2 + \frac{2Ns}{Ns+1}}\right),$$

for a clutch driven input to the first input of the compound planetary system $K = (h/l) \exp(1/(N_0-1))$ for a continuously variable driven input to the first input of the compound planetary system where H is the highest desired rated output speed of the transmission system, L is the lowest desired rated output speed to be attained in the normal operating range said normal operating range being the range of selectable speeds in which the first input of the compound planetary system remains connected through a gear ratio to the engine, $N_0$ is the number clutches in the output transmission, $N_S$ is the number of clutches in the gear set which selectively connects the engine through gear ratios to second input of the compound planetary system or stops said second input of said compound planetary system from rotation, h is the highest desired rated output speed of the transmission output with the variable hydrostatic unit set at zero output speed, and l is the lowest desired rated output speed of the transmission output with the variable hydrostatic unit set at zero output speed.

* * * * *